United States Patent
Ojala

(10) Patent No.: US 10,623,828 B2
(45) Date of Patent: Apr. 14, 2020

(54) METHOD AND SYSTEMS FOR GENERATING AND UTILIZING CONTEXTUAL WATERMARKING

(71) Applicant: PCMS Holdings, Inc., Wilmington, DE (US)

(72) Inventor: Pasi Sakari Ojala, Kirkkonummi (FI)

(73) Assignee: PCMS Holdings, Inc., Wilmington, DE (US)

( * ) Notice: Subject to any disclaimer, the term of this patent is extended or adjusted under 35 U.S.C. 154(b) by 57 days.

(21) Appl. No.: 15/752,237

(22) PCT Filed: Aug. 17, 2016

(86) PCT No.: PCT/US2016/047436
§ 371 (c)(1),
(2) Date: Feb. 12, 2018

(87) PCT Pub. No.: WO2017/034897
PCT Pub. Date: Mar. 2, 2017

(65) Prior Publication Data
US 2019/0261064 A1    Aug. 22, 2019

Related U.S. Application Data

(60) Provisional application No. 62/210,263, filed on Aug. 26, 2015.

(51) Int. Cl.
*H04N 7/167* (2011.01)
*H04N 21/8358* (2011.01)

(52) U.S. Cl.
CPC .............. *H04N 21/8358* (2013.01)

(58) Field of Classification Search
CPC ......... H04N 21/2187; H04N 21/23418; H04N 21/8358
See application file for complete search history.

(56) References Cited

U.S. PATENT DOCUMENTS 8,612,517 B1   12/2013   Yadid
8,683,601 B2   3/2014   Rassool
(Continued)

FOREIGN PATENT DOCUMENTS

EP    2260424         12/2010
WO    2016014254 A1   1/2016
WO    2016036612 A1   3/2016

OTHER PUBLICATIONS

Bano, S., et. al. "Discovery and Organization of Multi-Camera User-Generated Videos of the Same Event", Information Sciences, vol. 302, May 1, 2015, pp. 108-121.
(Continued)

*Primary Examiner* — Gigi L Dubasky
(74) *Attorney, Agent, or Firm* — Invention Mine LLC

(57) ABSTRACT

The present disclosure describes systems and methods for generating and utilizing contextual watermarks. In accordance with an embodiment the method includes: receiving reference sensor data characterizing a proprietary event; receiving a plurality of media streams for potential distribution, each media stream including respective embedded contextual sensor data; for each stream, comparing the reference sensor data with the respective embedded contextual sensor data to identify streams generated at the proprietary event; and distributing only those media streams that are not identified as being generated at the proprietary event.

16 Claims, 24 Drawing Sheets

(56) References Cited

U.S. PATENT DOCUMENTS

| | | | |
|---|---|---|---|
| 8,953,836 | B1 | 2/2015 | Postelnicu |
| 9,026,596 | B2* | 5/2015 | Perez .................. H04N 9/8205 345/207 |
| 2007/0143788 | A1 | 6/2007 | Abernethy, Jr. |
| 2007/0198839 | A1* | 8/2007 | Carle ...................... H04L 9/083 713/176 |
| 2008/0056497 | A1* | 3/2008 | Lee ......................... G06F 21/10 380/277 |
| 2009/0217343 | A1* | 8/2009 | Bellwood ............... G06F 21/10 726/1 |
| 2011/0289601 | A1 | 11/2011 | Bellwood |
| 2011/0316880 | A1 | 12/2011 | Ojala |
| 2012/0114310 | A1 | 5/2012 | Hymel |
| 2013/0276138 | A1* | 10/2013 | Schmelzer ............. G06F 21/10 726/27 |
| 2014/0156044 | A1 | 6/2014 | Boss |
| 2017/0078718 | A1* | 3/2017 | Ioffe ................ H04N 21/23439 |
| 2017/0372142 | A1* | 12/2017 | Bilobrov ............. G06F 16/2228 |

OTHER PUBLICATIONS

Konstantinou, N., et. al., "Chapter 5: Generating Linked Data in Real-time from Sensor Data Streams". In Materializing the Web of Linked Data, (2015), 83 pages.

Guardian Project, "Informacam: Secure and Verified Mobile Media". Web Archive dated Mar. 28, 2015, available at: https://web.archive.org/web/20150328134526/https://guardianproject.info/informa/, 4 pages.

Sensetream Channel, "Sensetream—Bringing Sensing Technology into YouTube, Skype and Any Video Applications". YouTube Link published on Sep. 17, 2014, 59 pages.

Notification of Transmittal of the International Search Report and the Written Opinion of the International Searching Authority, or the Declaration for PCT/US2016/047436 dated Nov. 17, 2016, 10 pages.

International Preliminary Report on Patentability for PCT/US2016/047436 dated Mar. 8, 2018.

Candès, E. et. al., "An Introduction to Compressive Sampling, A sensing/sampling paradigm that goes against the common knowledge in data acquisition" IEEE Signal Processing Magazine, Mar. 2008.

Blu, T. et. al., "Sparse Sampling of Signal Innovations, Theory, algorithms, and performance bounds" IEEE Signal Processing Magazine, Mar. 2008.

Cricri, F. et al., "Multimodal Semantics Extraction from User-Generated Videos", Hindawi Publishing Corporation, Advances in Multimedia, vol. 2012, Article ID: 292064, 17 pages. DOI: 10.1155/2012/292064, Accepted Mar. 2012.

Mughal, M.A. et. al., "Context-dependent software solutions to handle video synchronization and delay in collaborative live mobile video production", Pers Ubiquit Comput. Springer-Verlag London 2013, Published on Jul. 20, 2013.

Azevedo, João et al. "An API proposal for integrating sensor data into web apps and WebRTC." Proceedings of the 1st Workshop on All-Web Real-Time Systems, AweS 2015—In Conjunction with EuroSys 2015., Apr. 21, 2015. (5 pages).

Life on Air, Inc. Meerkat. (Jul. 8, 2015). (1.3.10) [Mobile application software]. Retrieved from https://web.archive.org/web/20150709193519/https://play.google.com/store/apps/details?id=co.getair.meerkat&hl=en (4 pages).

Meerkat (app). In Wikipedia. (Jul. 26, 2015). Retrieved from https://en.wikipedia.org/w/index.php?title=Meerkat_(app)&oldid=673102907. (3 pages).

Pullen, J. P. (Mar. 13, 2015). You Asked: What Is the Meerkat App?. Retrieved from https://time.com/3742746/meerkat/. (5 pages).

* cited by examiner

VIDEO SEQUNCE DETECTING A "MEXICAN WAVE" 1702

ACCELEROMETER SENSOR READING 1704

1700

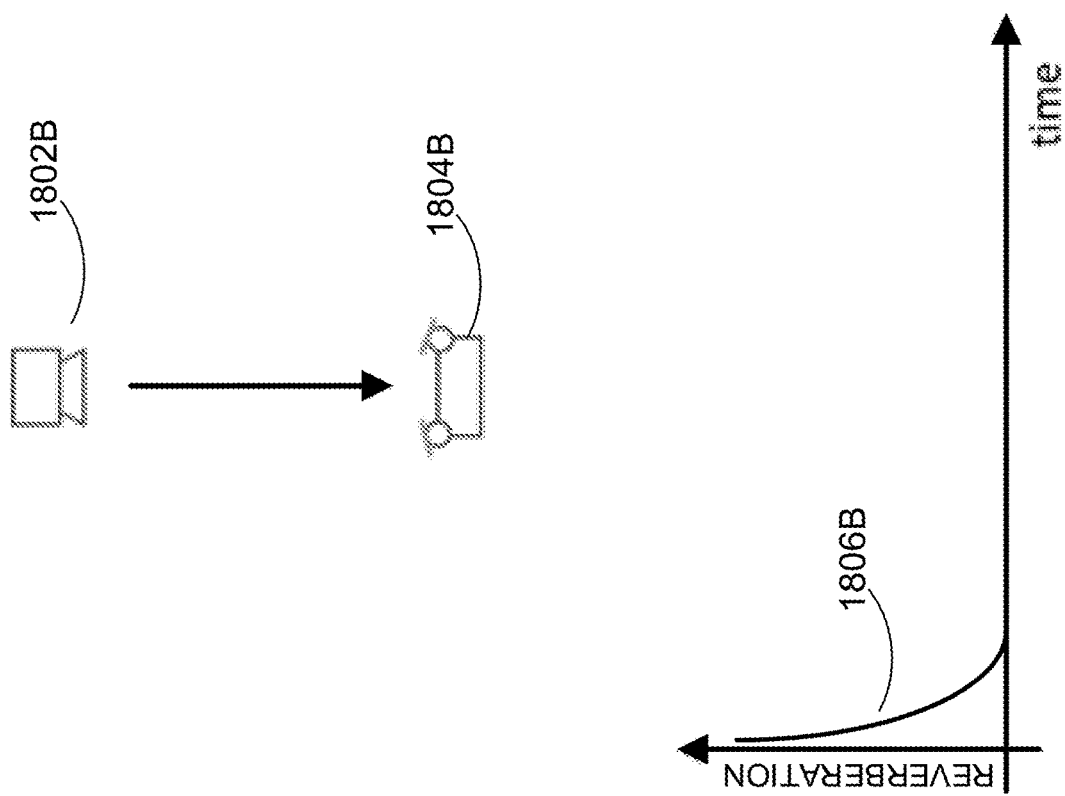
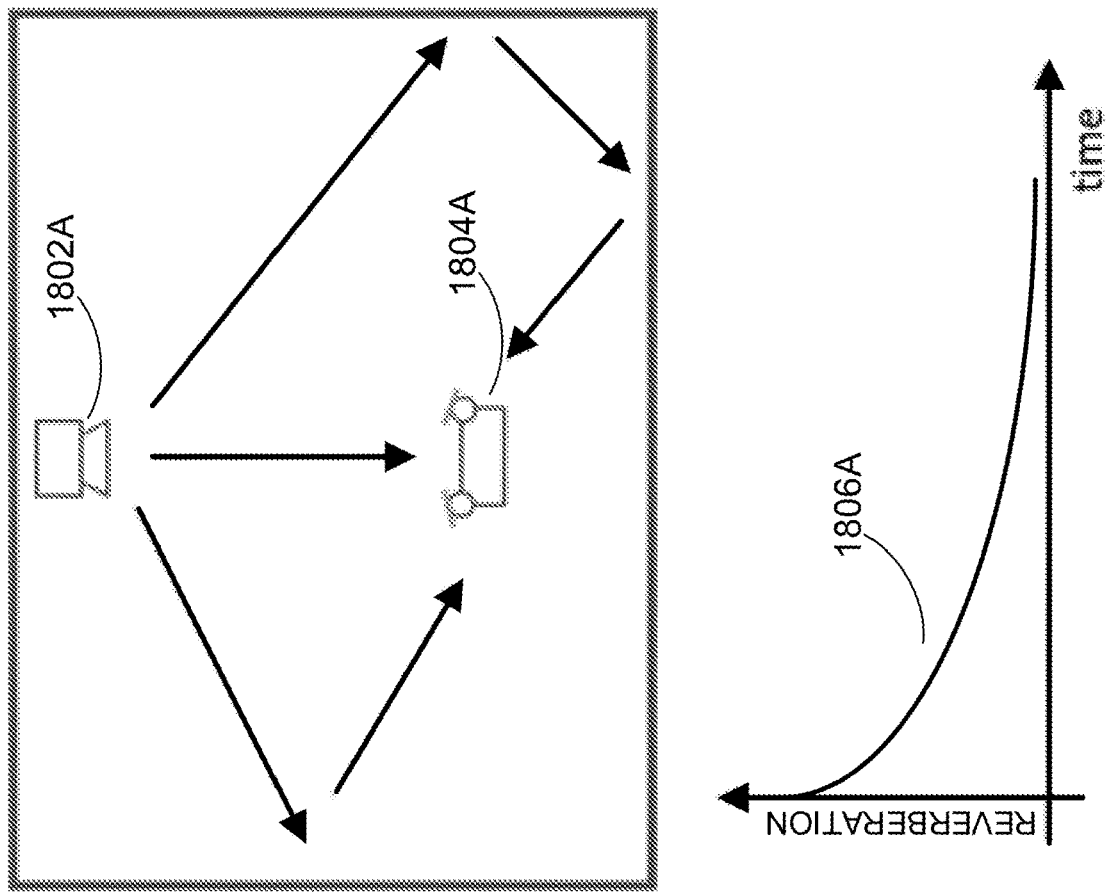
FIG. 18B
FIG. 18A

METHOD AND SYSTEMS FOR GENERATING AND UTILIZING CONTEXTUAL WATERMARKING

CROSS-REFERENCE TO RELATED APPLICATIONS

The present application is a national stage application under 35 U.S.C. 371 of International Application No. PCT/US2016/047436, entitled METHOD AND SYSTEMS FOR GENERATING AND UTILIZING CONTEXTUAL WATERMARKING, filed on Aug. 17, 2016, which claims benefit under 35 U.S.C. § 119(e) from, U.S. Provisional Patent Application Ser. No. 62/210,263, filed Aug. 26, 2015, entitled "Method and Systems for Generating and Utilizing Contextual Watermarking," incorporated herein by reference in its entirety.

BACKGROUND

Electronic devices, such as smart phones, enable the capture of video and audio at any place and time. Additionally, these electronic devices are able to upload and stream the captured content to the Internet via various data connections. Events commonly recorded include concerts, sporting events, plays, and parties. It is desirable to prevent the distribution of unauthorized video and audio streams from proprietary events. However, identification unauthorized streams may be problematic using existing tools, partly because the existing tools are optimized to recognize video content as referenced to professionally recorded and produced material.

Producers of videos, both amateur and professional, create media compositions by combining different audio and video streams together. Different computer software is used to compile the video from different sources into a finished video. The compiling often requires synchronizing the audio and video files, however, the synchronization is often limited to visual and audio cues in the media stream.

SUMMARY

Described herein are systems and methods for generating and utilizing contextual watermarking. The present disclosure describes systems and methods for generating and utilizing contextual watermarks. In accordance with an embodiment the method In accordance with an embodiment the method includes: receiving reference sensor data characterizing a proprietary event; receiving a plurality of media streams for potential distribution, each media stream including respective embedded contextual sensor data; for each stream, comparing the reference sensor data with the respective embedded contextual sensor data to identify streams generated at the proprietary event; and distributing only those media streams that are not identified as being generated at the proprietary event.

BRIEF DESCRIPTION OF THE DRAWINGS

A more detailed understanding may be had from the following description, presented by way of example in conjunction with the accompanying drawings, wherein:

FIGS. 18A and 18B depict indirect contextual cues associated with reverberation, in accordance with an embodiment.

DETAILED DESCRIPTION

A detailed description of illustrative embodiments will now be provided with reference to the various Figures. Although this description provides detailed examples of possible implementations, it should be noted that the provided details are intended to be by way of example and in no way limit the scope of the application. The systems and methods relating to contextual watermarking may be used with the wired and wireless communication systems described with respect to FIGS. 1A-1D. As an initial matter, these wired and wireless systems will be described.

Figure 1A:
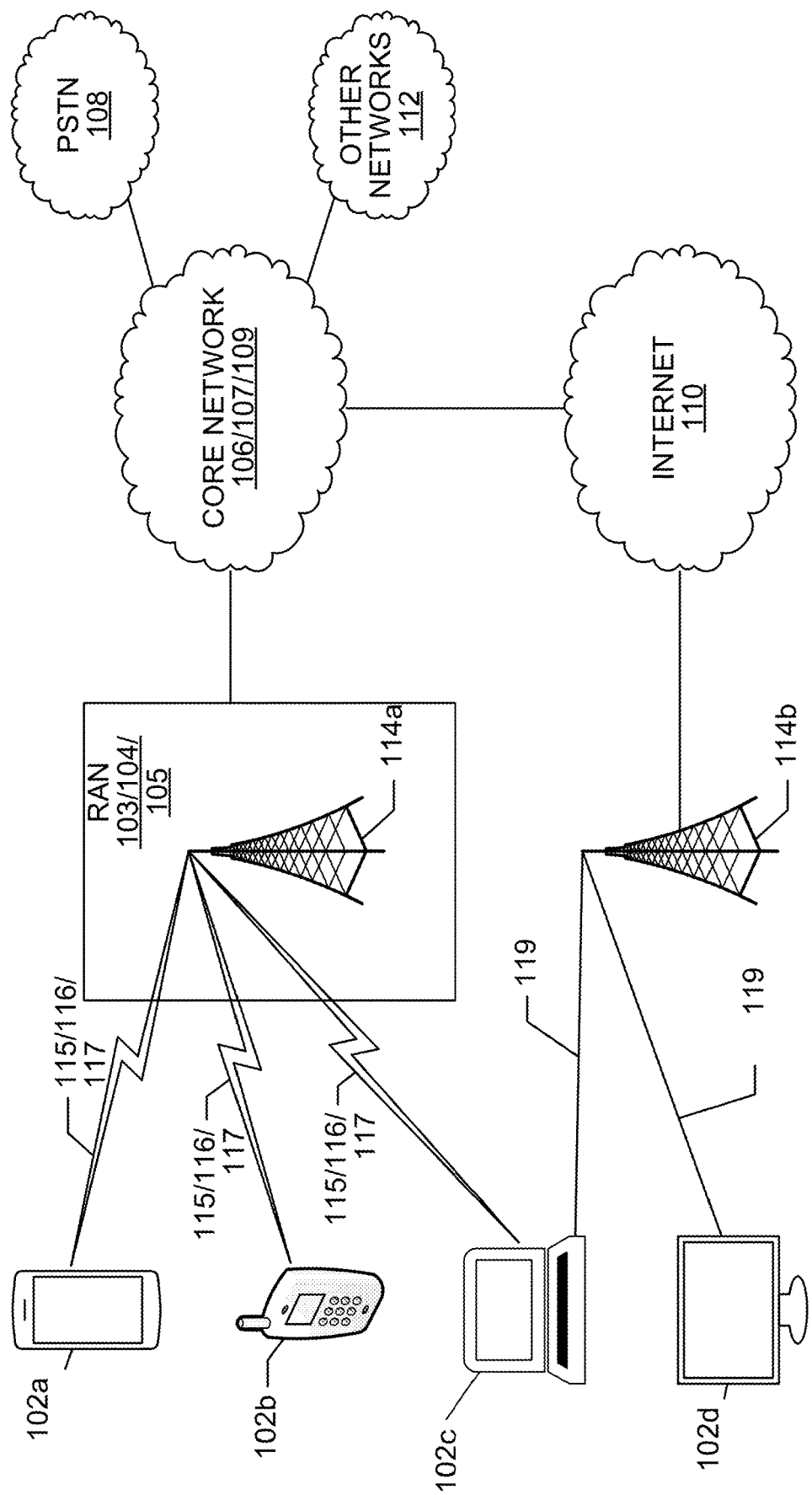
FIG. 1A depicts an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, and the like, to multiple wireless users. The communications system 100 may enable multiple wired and wireless users to access such content through the sharing of system resources, including wired and wireless bandwidth. For example, the communications systems 100 may employ one or more channel-access methods, such as code division multiple access (CDMA), time division multiple access (TDMA), frequency division multiple access (FDMA), orthogonal FDMA (OFDMA), single-carrier FDMA (SC-FDMA), and the like. The communications systems 100 may also employ one or more wired communications standards (e.g. Ethernet, DSL, radio frequency (RF) over coaxial cable, fiber optics, and the like.

As shown in FIG. 1A, the communications system 100 may include electronic devices 102a, 102b, 102c, and/or 102d, Radio Access Networks (RAN) 103/104/105, a core network 106/107/109, a public switched telephone network (PSTN) 108, the Internet 110, and other networks 112, and communication links 115/116/117, and 119, though it will be appreciated that the disclosed embodiments contemplate any number of electronic devices, base stations, networks, and/or network elements. Each of the electronic devices 102a, 102b, 102c, 102d may be any type of device configured to operate and/or communicate in a wired or wireless environment. By way of example, the electronic device 102a is depicted as a tablet computer, the electronic device 102b is depicted as a smart phone, the electronic device 102c is depicted as a computer, and the electronic device 102d is depicted as a television, although certainly other types of devices could be utilized.

The communications systems 100 may also include a base station 114a and a base station 114b. Each of the base stations 114a, 114b may be any type of device configured to wirelessly interface with at least one of the wireless transmit receive units (WTRUs) 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, and the like. The base station 114a and/or the base station 114b may be configured to transmit and/or receive wireless signals within a particular geographic region, which may be referred to as a cell (not shown). The cell may further be divided into sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the electronic devices 102a, 102b, 102c, and 102d over an air interface 115/116/117, or communication link 119, which may be any suitable wired or wireless communication link (e.g., radio frequency (RF), microwave, infrared (IR), ultraviolet (UV), visible light, and the like).

The air interface 115/116/117 may be established using any suitable radio access technology (RAT).

More specifically, as noted above, the communications system 100 may be a multiple access system and may employ one or more channel-access schemes, such as CDMA, TDMA, FDMA, OFDMA, SC-FDMA, and the like. For example, the base station 114a in the RAN 103/104/105 and the electronic devices 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the electronic devices 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the electronic devices 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wired router, a wireless router, Home Node B, Home eNode B, or access point, as examples, and may utilize any suitable wired transmission standard or RAT for facilitating wireless connectivity in a localized area, such as a place of business, a home, a vehicle, a campus, and the like. In one embodiment, the base station 114b and the electronic devices 102c, 102d may implement a radio technology such as IEEE 802.11 to establish a wireless local area network (WLAN). In another embodiment, the base station 114b and the electronic devices 102c, 102d may implement a radio technology such as IEEE 802.15 to establish a wireless personal area network (WPAN). In yet another embodiment, the base station 114b and the electronic devices 102c, 102d may utilize a cellular-based RAT (e.g., WCDMA, CDMA2000, GSM, LTE, LTE-A, and the like) to establish a picocell or femtocell. In yet another embodiment, the base station 114b communicates with electronic devices 102a, 102b, 102c, and 102d through communication links 119. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the electronic devices 102a, 102b, 102c, 102d. As examples, the core network 106/107/109 may provide call control, billing services, mobile location-based services, pre-paid calling, Internet connectivity, video distribution, and the like, and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the electronic devices 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and IP in the TCP/IP Internet protocol suite. The networks 112 may include wired and/or wireless communications networks owned and/or operated by other service providers. For example, the networks 112 may include another core network connected to one or more RANs, which may employ the same RAT as the RAN 103/104/105 or a different RAT.

Some or all of the electronic devices 102a, 102b, 102c, 102d in the communications system 100 may include multi-mode capabilities, i.e., the electronic devices 102a, 102b, 102c, 102d may include multiple transceivers for communicating with different wired or wireless networks over different communication links. For example, the WTRU 102c shown in FIG. 1A may be configured to communicate with the base station 114a, which may employ a cellular-based radio technology, and with the base station 114b, which may employ an IEEE 802 radio technology.

Figure 1B:
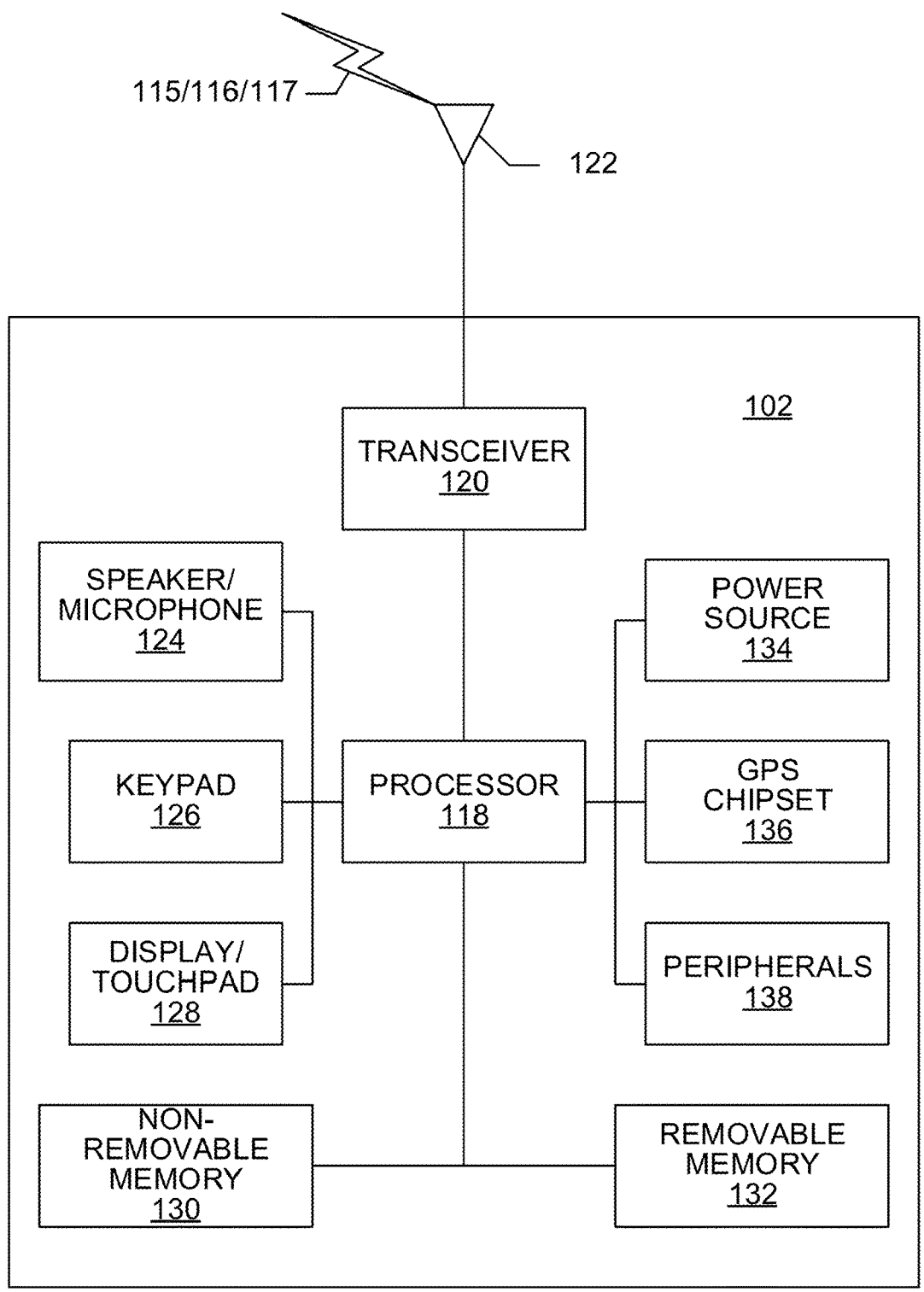
FIG. 1B depicts an example electronic device that may be used within the communications system of FIG. 1A.

FIG. 1B depicts an example electronic device that may be used within the communications system of FIG. 1A. In particular, FIG. 1B is a system diagram of an example electronic device 102. As shown in FIG. 1B, the electronic device 102 may include a processor 118, a transceiver 120, a transmit/receive element 122, a speaker/microphone 124, a keypad 126, a display/touchpad 128, a non-removable memory 130, a removable memory 132, a power source 134, a global positioning system (GPS) chipset 136, and other peripherals 138. It will be appreciated that the electronic device 102 may represent any of the electronic devices 102a, 102b, 102c, and 102d, and include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the electronic device 102 to operate in a wired or wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117 or communication link 119. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, as examples. In yet another embodiment, the transmit/receive element 122 may be configured to transmit and receive both RF and light signals. In yet another embodiment, the transmit/receive element may be a wired communication port, such as an Ethernet port. It will be appreciated that the transmit/receive element 122 may be configured to transmit and/or receive any combination of wired or wireless signals.

In addition, although the transmit/receive element 122 is depicted in FIG. 1B as a single element, the electronic device 102 may include any number of transmit/receive elements 122. More specifically, the electronic device 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the electronic device 102 may have multi-mode capabilities. Thus, the transceiver 120 may include multiple transceivers for enabling the electronic device 102 to communicate via multiple RATs, such as UTRA and IEEE 802.11, as examples.

The processor 118 of the electronic device 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the electronic device 102, such as on a server or a home computer (not shown).

The processor 118 may receive power from the power source 134, and may be configured to distribute and/or control the power to the other components in the electronic device 102. The power source 134 may be any suitable device for powering the WTRU 102. As examples, the power source 134 may include one or more dry cell batteries (e.g., nickel-cadmium (NiCd), nickel-zinc (NiZn), nickel metal hydride (NiMH), lithium-ion (Li-ion), and the like), solar cells, fuel cells, a wall outlet and the like.

The processor 118 may also be coupled to the GPS chipset 136, which may be configured to provide location information (e.g., longitude and latitude) regarding the current location of the electronic device 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the electronic device 102 may acquire location information by way of any suitable location-determination method while remaining consistent with an embodiment. In accordance with an embodiment, the electronic device 102 does not comprise a GPS chipset and does not acquire location information.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, a thermometer, a barometer, an altimeter, an air sampler, a light detector, an accelerometer, a compass, a humidity detector, and the like. The various peripherals may be configured to detect surrounding events in order to capture video and audio streams and associated contextual information.

Figure 1C:
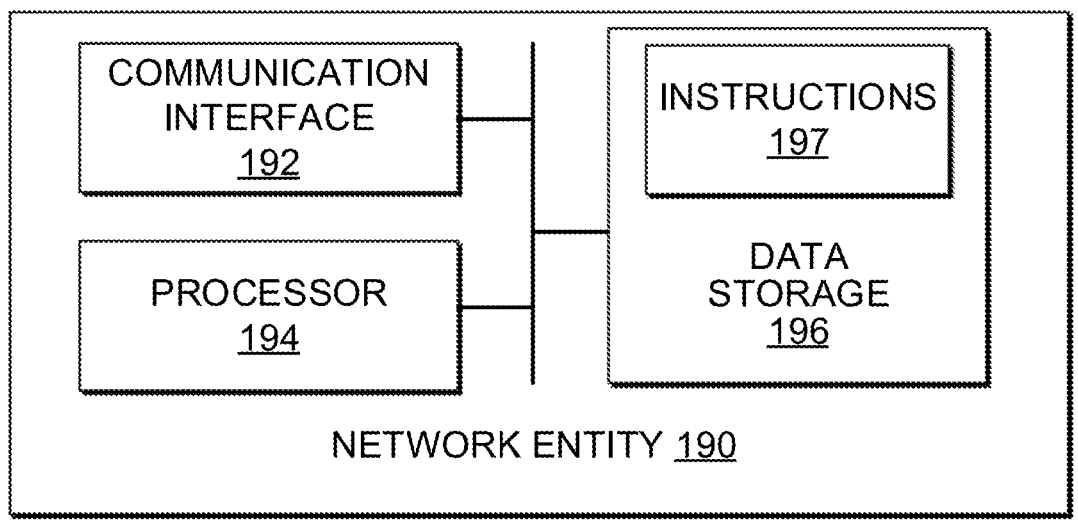
FIG. 1C depicts an example network entity 190, that may be used within the communication system 100 of FIG. 1A.

FIG. 1C depicts an example network entity 190 that may be used within the communication system 100 of FIG. 1A. As depicted in FIG. 1C, network entity 190 includes a communication interface 192, a processor 194, and non-transitory data storage 196, all of which are communicatively linked by a bus, network, or other communication path 198.

Communication interface 192 may include one or more wired communication interfaces and/or one or more wireless-communication interfaces. With respect to wired communication, communication interface 192 may include one or more interfaces such as Ethernet interfaces, as an example. With respect to wireless communication, communication interface 192 may include components such as one or more antennae, one or more transceivers/chipsets designed and configured for one or more types of wireless (e.g., LTE) communication, and/or any other components deemed suitable by those of skill in the relevant art. And further with respect to wireless communication, communication interface 192 may be equipped at a scale and with a configuration appropriate for acting on the network side—as opposed to the client side—of wireless communications (e.g., LTE communications, Wi-Fi communications, and the like). Thus, communication interface 192 may include the appropriate equipment and circuitry (perhaps including multiple transceivers) for serving multiple mobile stations, UEs, or other access terminals in a coverage area.

Processor 194 may include one or more processors of any type deemed suitable by those of skill in the relevant art, some examples including a general-purpose microprocessor and a dedicated DSP.

Data storage 196 may take the form of any non-transitory computer-readable medium or combination of such media, some examples including flash memory, read-only memory (ROM), and random-access memory (RAM) to name but a few, as any one or more types of non-transitory data storage deemed suitable by those of skill in the relevant art could be used. As depicted in FIG. 1F, data storage 196 contains program instructions 197 executable by processor 194 for carrying out various combinations of the various network-entity functions described herein.

In some embodiments, the network-entity functions described herein are carried out by a network entity having a structure similar to that of network entity 190 of FIG. 1C. In some embodiments, one or more of such functions are carried out by a set of multiple network entities in combination, where each network entity has a structure similar to that of network entity 190 of FIG. 1C. In various different embodiments, network entity 190 is—or at least includes—one or more of the encoders, one or more of (one or more entities in) RAN 103, (one or more entities in) RAN 104, (one or more entities in) RAN 105, (one or more entities in) core network 106, (one or more entities in) core network 107, (one or more entities in) core network 109, base station 114a, base station 114b, Node-B 140a, Node-B 140b, Node-B 140c, RNC 142a, RNC 142b, MGW 144, MSC 146, SGSN 148, GGSN 150, eNode-B 160a, eNode-B 160b, eNode-B 160c, MME 162, serving gateway 164, PDN gateway 166, base station 180a, base station 180b, base station 180c, ASN gateway 182, MIP-HA 184, AAA 186, and gateway 188. And certainly other network entities and/or combinations of network entities could be used in various embodiments for carrying out the network-entity functions described herein, as the foregoing list is provided by way of example and not by way of limitation.

Figure 1D:
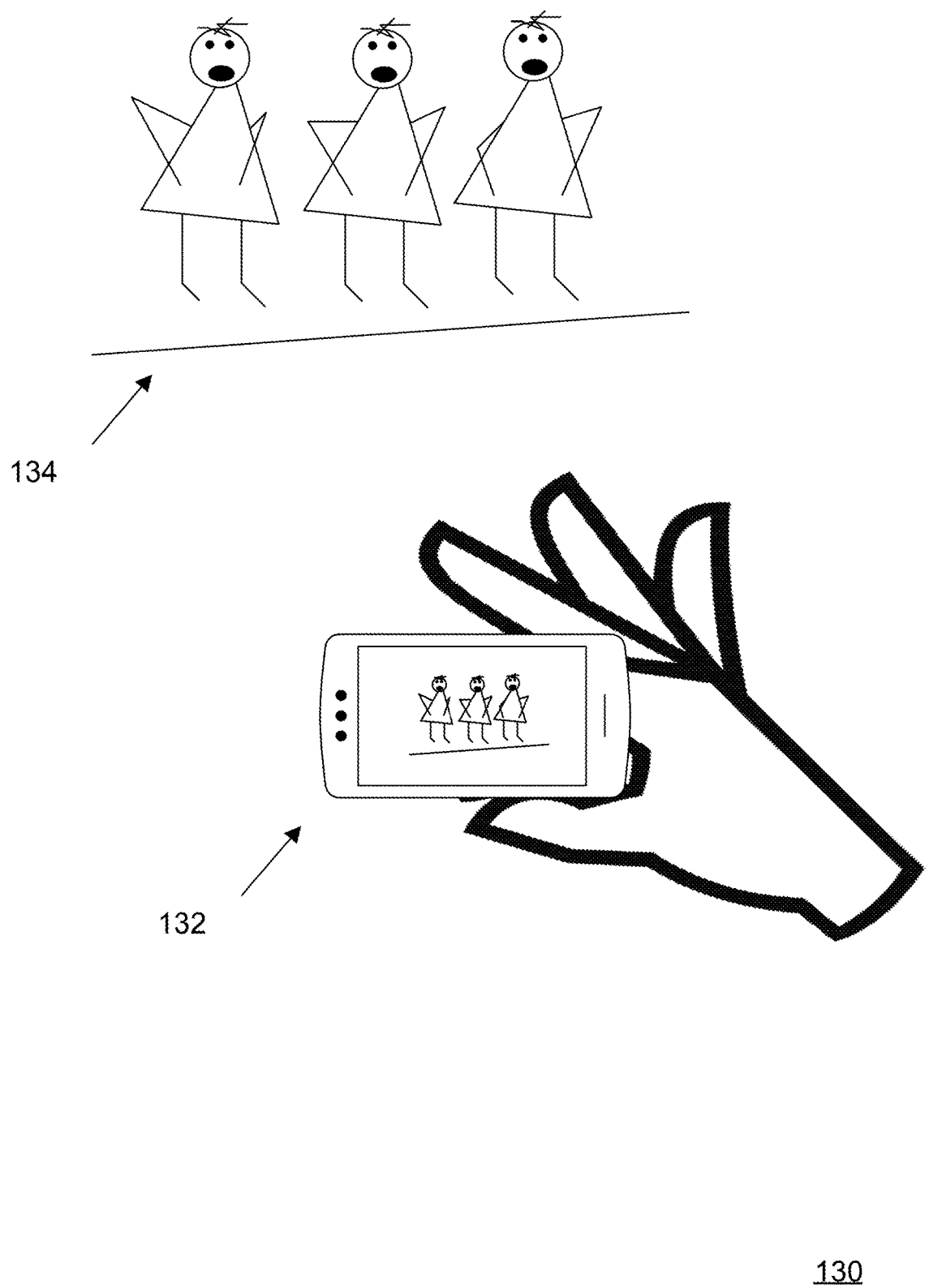
FIG. 1D depicts a view of an electronic device, in accordance with an embodiment.

FIG. 1D depicts a view of an electronic device, in accordance with an embodiment. In particular, FIG. 1D depicts the view 130. The view 130 includes the electronic device 132 recording a live event 134. The live event 134 is depicted as a concert, but it could be recording any such event, such as a sunset or a concert. The electronic device 132 can be any of the electronic devices described in FIGS. 1A and 1B and be configured to transfer data to the internet via different wired and wireless data connections. In this embodiment, the electronic device may be configured to record both audio and video of the event. The electronic devices may be further configured to transmit the recorded audio and video to the internet via a data connection. The transmission may be a real-time stream of the concert to another electronic device or may also be a time-delayed upload to a computer or network server.

Video or audio, also referred to as a media stream, playing on a television or a radio can be identified by capturing a portion of the audio or video signal, creating a finger print of the captured media, and comparing the fingerprint of the captured media with a database of previously recorded media fingerprints. However, identifying media in this method requires a pre-recorded and analyzed source material and these methods do not take into account additional contextual cues, such as location.

Different media streams may be aligned with different audio-visual content streams by analyzing the audio stream, resulting in a temporal, or synchronous, alignment of the different streams. Additionally, various watermarking techniques rely mainly on the audio and visual content. These techniques analyze the content of the audio or video streams and include content-specific watermarks in the content bit stream. Detection of the audio or video comprises detecting the content-specific watermark and can facilitate detecting unauthorized distributions of the media streams.

Detecting a recorded media stream of a live performance is difficult with existing solutions because the live performance may deviate from a professionally produced version of a song, recordings may be of different quality, and the like. Additionally, location data embedded in a media stream may not be relied on to determine the actual location of where the media was recorded. Often times, location data is not available indoors, or the location can be manually overridden or disabled.

In accordance with an embodiment, a live performance is captured in a media stream with an electronic device associated with a user, such as a smart phone. Additionally, the live performance is also captured by an electronic device associated with a content producer and a plurality of other electronic devices associated with other users. The captured content includes primary content and secondary content. Primary content is content the user is interested in, such as an audio, a visual, or both an audio and a visual capture of the live performance. The audio may be mono, stereo or multi-channel audio and the visual capture may be a single image or a video. Secondary content includes other contextual information associated with the live performance. Examples of secondary content include prevailing radio conditions, radio signal strength, available WiFi and Bluetooth signals, cellular network details, radio beacons, motion, orientation, and general environmental information such as room reverberation. Detection of secondary content is limited by sensors associated with different electronic devices. The secondary content may be stored as side information, metadata, or content descriptors for classifying and identifying the primary content.

The multimodal content consisting of primary and secondary sensor signals can be applied for event detection and classification in order to create feature vectors and content identifiers. The secondary content that is not intended for media representation could be sampled with significantly lower sampling rate and lower dynamics compared to primary content. One use of the secondary content is to find descriptive contextual cues about the location, captured event time window and environmental conditions at the point of content capture. Hence, a sparse representation of the secondary content is sufficient. To save storage space further, the secondary content as such may not be stored at all. The compressed sensing methodology is applied to further reduce the sampling rate of the sparse content. The secondary content may consist of limited number and duration bursts of data. That is, the sparse domain compressed content could be stored only at predetermined intervals or in case of significant transients or content changes in the sensor signal exceeding a predetermined threshold.

Contextual cues can also be extracted in similar manner also from the primary content. Since the primary content is available in a capture of the event, it is advantageous if the contextual cues are determined based on transients and impulse type of features in the content. Since the plurality of electronic devices recording the content simultaneously do not have synchronized timing, the content-based timing of contextual cue extraction is more reliable. Both primary and secondary content could be used to synchronize the time slots.

Sensor signals as such are seldom readily available in the sparse domain when sampled with the given regular sampling frequency and converted to digital domain. Although the actual information content is typically far less than the given sampling frequency would suggest, the time domain signal cannot be sampled with a lower rate without losing information. Therefore, to enable compressed sensing, the signal may be transformed in proper domain suitable for sparse representation.

A signal consisting of sinusoidal harmonics, for example, can be represented in time-frequency transform domain quite efficiently as a sparse impulse train. On the other hand, a sudden change in radio signal strength, number of Wi-Fi hot spots, cellular network details, background noise level, a sound event such as clapping of hands, flash of light, or acceleration of the structure in which the sensor nodes are attached can be considered sparse. The compressed sensing can then be performed for example when the sparse signal is processed with a complex domain transform.

For a detected event that is a time domain transient, a simple high-pass filtering removes unnecessary data. Since the access method is only determining whether the connecting device and existing sensor network detected the event simultaneously, there is no need to capture more details about the signal. In order to capture the contextual cues, it may be sufficient to record only the transient incidents.

In another embodiment, the content may be transformed with a discrete Fourier transform (DFT) or discrete wavelet transform (DWT) to enable scalable representation. Harmonic signals are compressed significantly in the DFT domain. And, in case of DWT, the sparse representation may consist of the most significant coefficients in the beginning of the transform vector, or the highest magnitude coefficients.

In addition, the signal can be converted to the sparse domain by band-pass filtering and having for example a signal variance based threshold function on signal level. That is, when the filtered signal exceeds a predetermined level, the output is activated. It is advantageous to apply an adaptive threshold function. The threshold may for example have a value 2.0× sensor signal variance in the given analysis window. The result is a sparse time domain signal carrying information only about the event start and stop time.

Furthermore, it is advantageous to normalize the resulting sparse signal. Alternatively, each time domain pulse in the sparse signal is assigned the value "1" or "−1" depending on the sign of the pulse, or the signal level is normalized so that the inner product of the signal is unity.

The captured sparse events are transmitted to the contextual analysis entity that conducts the similarity check. Increasing the efficiency improves the process because the process may be continuous, or take a long time, requiring extra resources. One method to handle sparse events is by compressed sensing that enables efficient means to sample the event while reducing the number of parameters.

Figure 2:
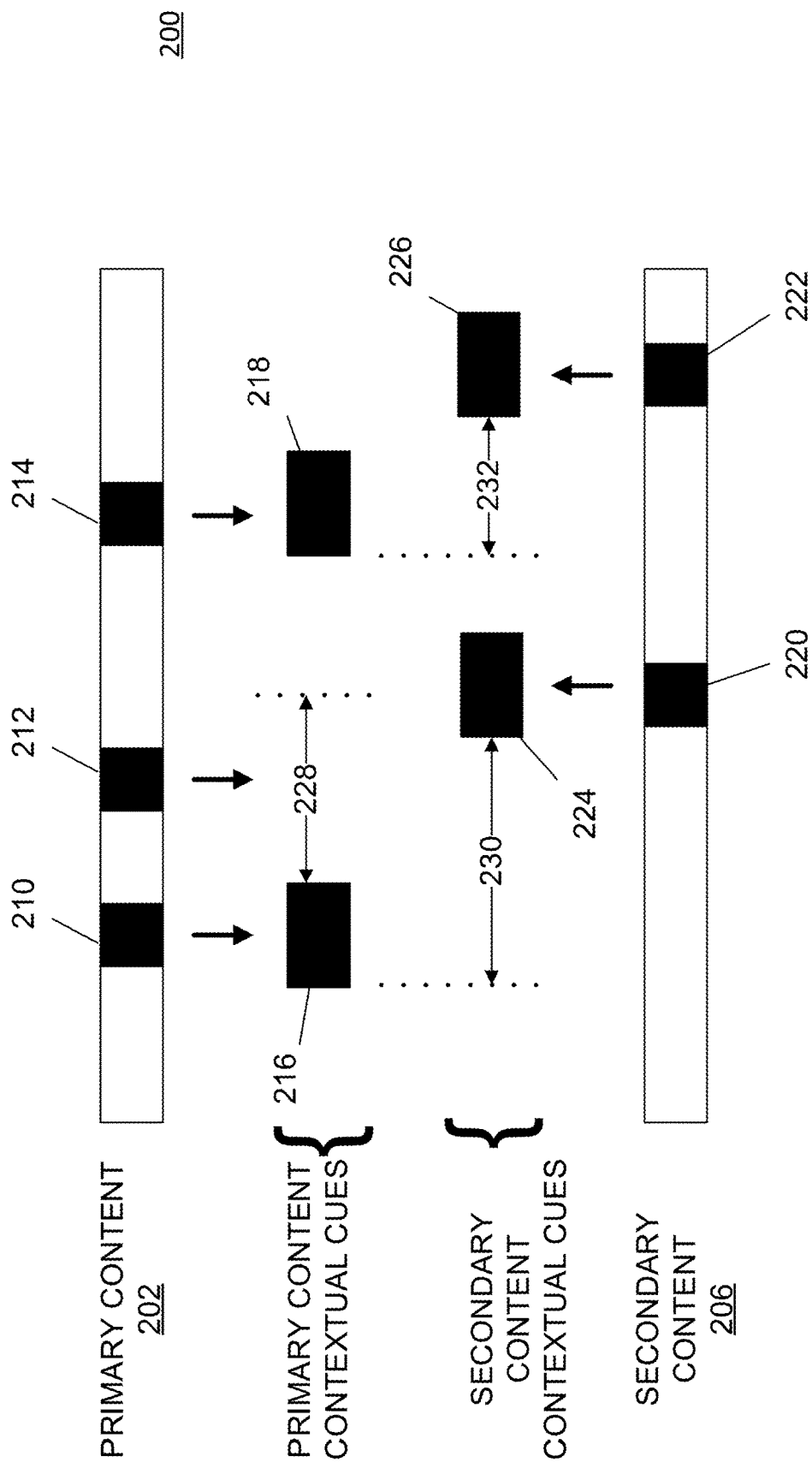
FIG. 2 depicts the detection of contextual cues in primary and secondary content associated with a media capture, in accordance with an embodiment.

The sparse event may be multiplied by a predefined sensing matrix. The sensing matrix transforms the sparse signal so that it is suitable for sparse representation. The transform domain signal is then resampled with a significantly lower sampling rate. The signal is subsampled for example by taking couple of random transform domain samples. It should be noted that, although the selection is random, the selection mechanism is stored since it is used later in the reconstruction phase FIG. 2 depicts the detection of contextual cues in primary and secondary content associated with a media capture, in accordance with an embodiment. In particular, FIG. 2 depicts a media capture 200. The media capture 200 comprises primary content 202 and secondary content 206 on the top and bottom, respectively. The media captures, such as media capture 200, progress in time from the left to the right. The primary content 202 comprises detected transients 210, 212, and 214. The secondary content 206 comprises detected transients 220 and 222. The contextual cues 216 and 218 are associated with the detected transients 210 and 214, respectively, from the primary content. The contextual cues 224 and 226 are associated with the detected transients 220 and 222, respectively, from the secondary content. The media capture 200 further comprises a trailing period 228 and relative times 230 and 232.

The number of contextual cues stored may be limited with a trailing period. The trailing period is a period of time after a cue is detected during which no other cues are stored. While the media capture 200 depicts the trailing period 228 associated with the primary content, a trailing period may also, or alternatively, be implemented for the secondary contextual cues. In the media capture 200, time progresses from left to right. For example, the transient 212 occurs later in time than the transient 210 and before the transient 214.

The contextual cues associated with the primary content may or may not be associated with a time stamp. In embodiments where the primary content is not associated with a time stamp, the timing of the contextual cues can be reproduced at a later time by referring to the primary content.

The secondary content may or may not be stored in accordance with an embodiment. In an embodiment that does not store the secondary content, the secondary content contextual cues are stored with timing information. The timing information may be a stored as a time stamp, or a relative time from a primary content contextual cue.

In the media stream 200, the primary content 202 comprises three detected transients 210, 212, and 214. The first in time detected transient, transient 210, corresponds to the first in time contextual cue 216. This contextual cue does not need a time stamp as it is associated with primary content, which has associated time stamp. The second detected transient, transient 212, in the primary content falls within the trailing period 228 of the contextual cue 216, and thus a contextual cue is not created for the detected transient 212. However, the third detected transient, transient 214, occurs after the trailing period 228 ends, and this is stored as the contextual cue 218 associated with the primary content.

In the media stream 200, the secondary content 206 comprises two detected transients 220 and 222. The transient 220 corresponds to the contextual cue 224 and the detected transient 222 corresponds to the contextual cue 226. The contextual cue 224 occurs a relative time period after the contextual cue 216, indicated by the time period 230. The contextual cue 226 occurs a relative time period after the contextual cue 218, indicated by the time period 232. The contextual cues 224 and 226 may be associated with a time stamp indicating when they occurred, or they can also be associated with the relative time after the primary content contextual cue.

The contextual cues from the primary and secondary content are dependent on each other, and thus coded and multiplexed as linked parameters. When the criteria for a transient, or event, are met, the corresponding cues are extracted, compressed, and stored from the content. In another embodiment, that in addition to relative timing, a sequence number may be used to link the secondary contextual cue to a primary contextual cue.

Determination of the length of the trailing period (or whether a trailing period is utilized at all) may be made based on bandwidth constraints, frequency of detected transients, and the like.

The contextual cues for both the primary content and secondary content are stored in the content payload as header information or metadata. Primary content contextual cues are stored as an array of compressed domain parameters in which an array of secondary contextual cues are multiplexed in the order of appearance. The secondary content cues contain an additional relative time stamp. The timestamp value is determined as the time difference to the beginning of the primary content cue analysis window. If the secondary content did not have any detected transients exceeding the predetermined transient threshold before the next contextual cue is extracted from the primary content, the data field is left blank. The contextual cues corresponding to the primary content are implicitly the same modality to the actual content format, however, the contextual cues associated with the secondary content data fields contain an identification of a corresponding sensor modality.

The contextual cues of both the primary content and secondary content can be utilized to detect and/or identify a media stream as being associated with a particular event, location, or time. In one embodiment, the contextual cues are embedded in the media stream. The contextual cues are stored in a method that allows any modification of the content, or corresponding contextual cues, to be detected. In embodiments where the primary content contextual cues are not stored with time stamp information, the time associated with the primary contextual cues can be determined by referencing the primary content. However, the secondary contextual cues may not be stored relative to the primary content, but as a relative time to a primary content contextual cue. Thus, the temporal location of the secondary content contextual cues is determined by reproducing the primary content's contextual cues.

In accordance with an embodiment, the contextual similarity of multiple recordings can be determined. In one embodiment, the contextual similarity to a particular content stream is compared to a reference content stream, wherein the source of the reference content stream is reliable. The comparison comprises comparing the contextual cues associate with the particular content stream with the contextual cues of the reference content stream.

In this comparison, the contextual cues associated with the reference content stream are received in sparse domain and reconstructed in the time domain. The sparse event which was achieved, for example by band-pass filtering the actual measured event, is reconstructed with a limited number of pulses with corresponding amplitudes. The comparison process may be performed without receiving compressed domain cues from the reference content. The reference content may be processed through a predefined context extraction functionality and the resulting sparse domain cues are compared against the received cues.

Figure 3:
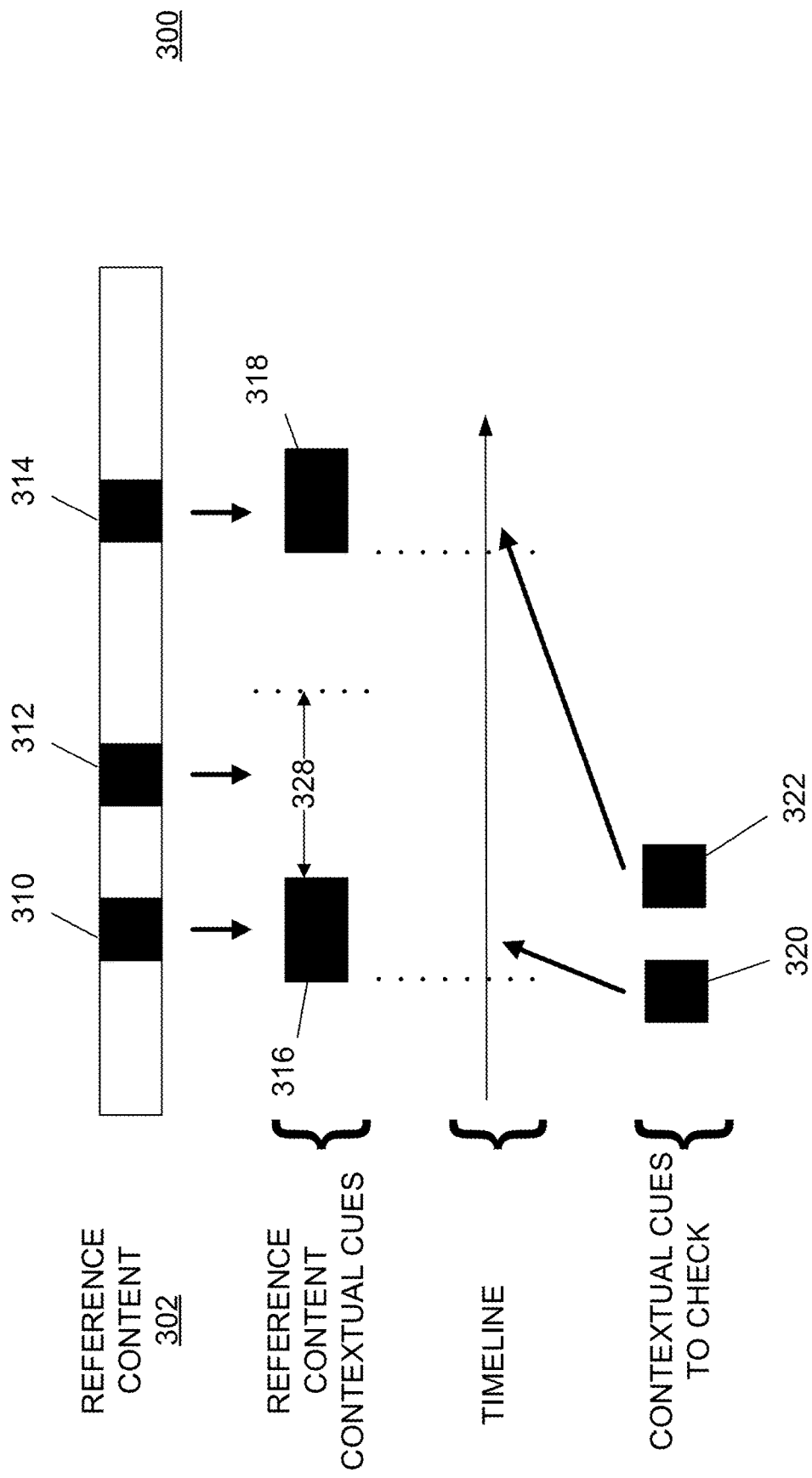
FIG. 3 depicts an example contextual cue comparison, in accordance with an embodiment.

FIG. 3 depicts an example contextual cue comparison, in accordance with an embodiment. In particular, FIG. 3 depicts the contextual cue reproduction 300. The reproduction 300 comprises a reference content 302 that includes detected transients 310, 312, and 314, reference content contextual cues 316 and 318, contextual cues 320 and 322, and a trailing period 328. The timing information of the reference content contextual cues is collected simultaneously with the reference content.

Similar to the discussion of FIG. 2, the reference content 302 comprises three detected transients, which associate to two contextual cues. Here, transients 310 and 314 correspond to the reference content contextual cues 316 and 318, respectively. The transient 312 occurs during the trailing period 328, and is thus not recorded.

In accordance with an embodiment, the duration of the trailing period 328 may vary. The trailing period may be increased or decreased according to a number of variables, including metadata bitrate and size constraints. Because the trailing period 328 may vary, multiple comparisons between several consecutive reference cues may be performed.

A comparison between the reference contextual cues (316 and 318) and other contextual cues (320 and 322) can be made in the time domain. If the sparse domain signal extracted in content transients is available internally, the comparison can be made. When the reconstructed sparse signals have time domain pulses within identical location with similar amplitude, this stronger correlation can be considered that the reference content and the particular stream to be checked are associated with the same event.

Figure 4A:
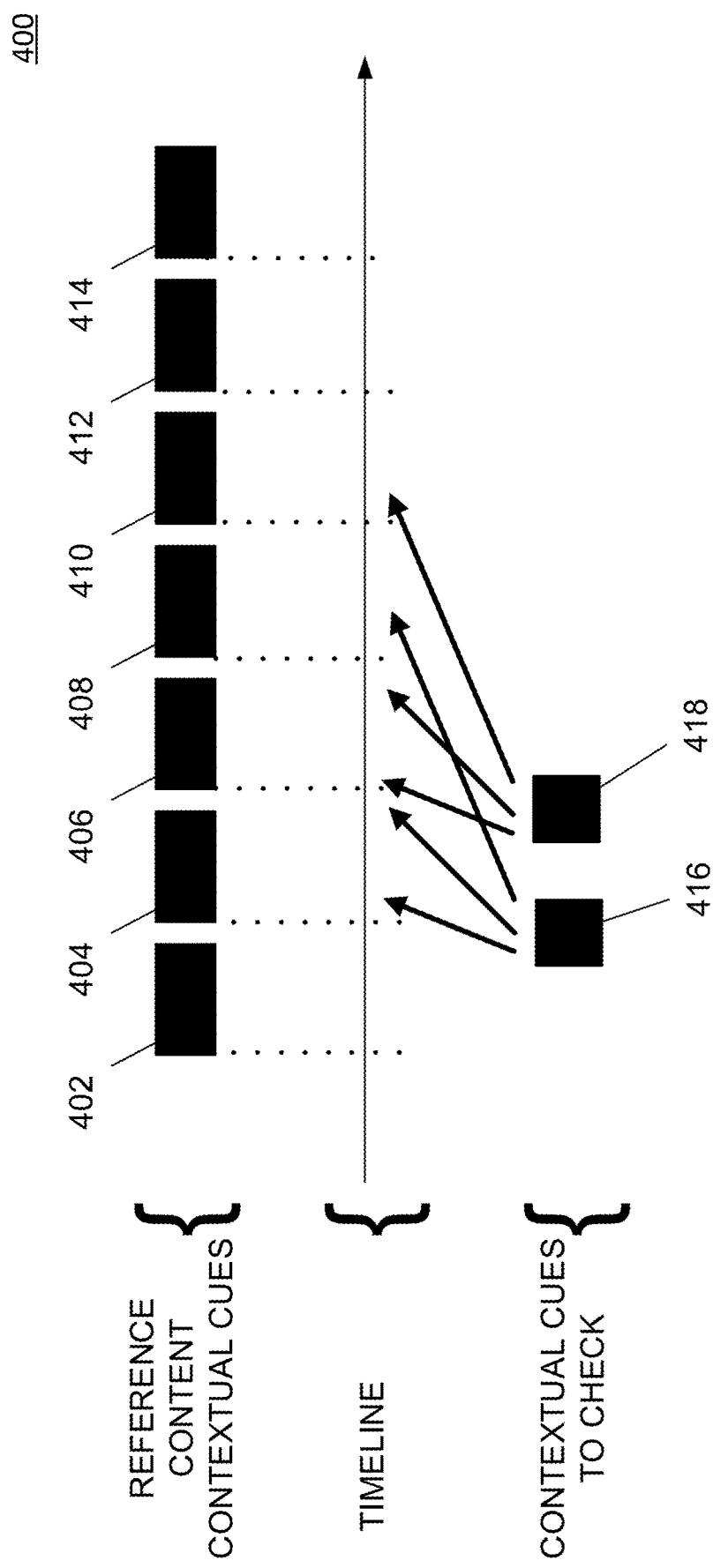
FIG. 4A depicts a sliding contextual cue comparison, in accordance with an embodiment.

FIG. 4A depicts a sliding contextual cue comparison, in accordance with an embodiment. In particular, FIG. 4A depicts the comparison 400. The comparison 400 comprises the reference content contextual cues 402-414, and contextual cues to check 416 and 418. In another embodiment, the comparison entity extracts the contextual cues from the reference material and stores them with a corresponding timestamp as comparison metadata in a first phase of a comparison check. The cues are compared to a sliding window over the reference cues. The contextual cues to check (416 and 418) are associated with a media stream that is being checked against a reference media stream. The timing information of the reference cues is not needed during the comparison; it is only used to organize the reference cues (402-414) in descending order. When the comparison entity matches the contextual cues to be checked to a set of reference contextual cues, the corresponding timing information is then associated with the contextual cues to be checked (416-418).

In a second phase of a comparison check, the corresponding timing information associated with the contextual cues is used to associate times with secondary content contextual cues. The secondary content contextual cues can be placed in line with the reference content contextual cues in time order, utilizing relative time differences already associated with the secondary content contextual cues. Sensor identification information can be used to enable comparison between correct modalities.

Figure 4B:
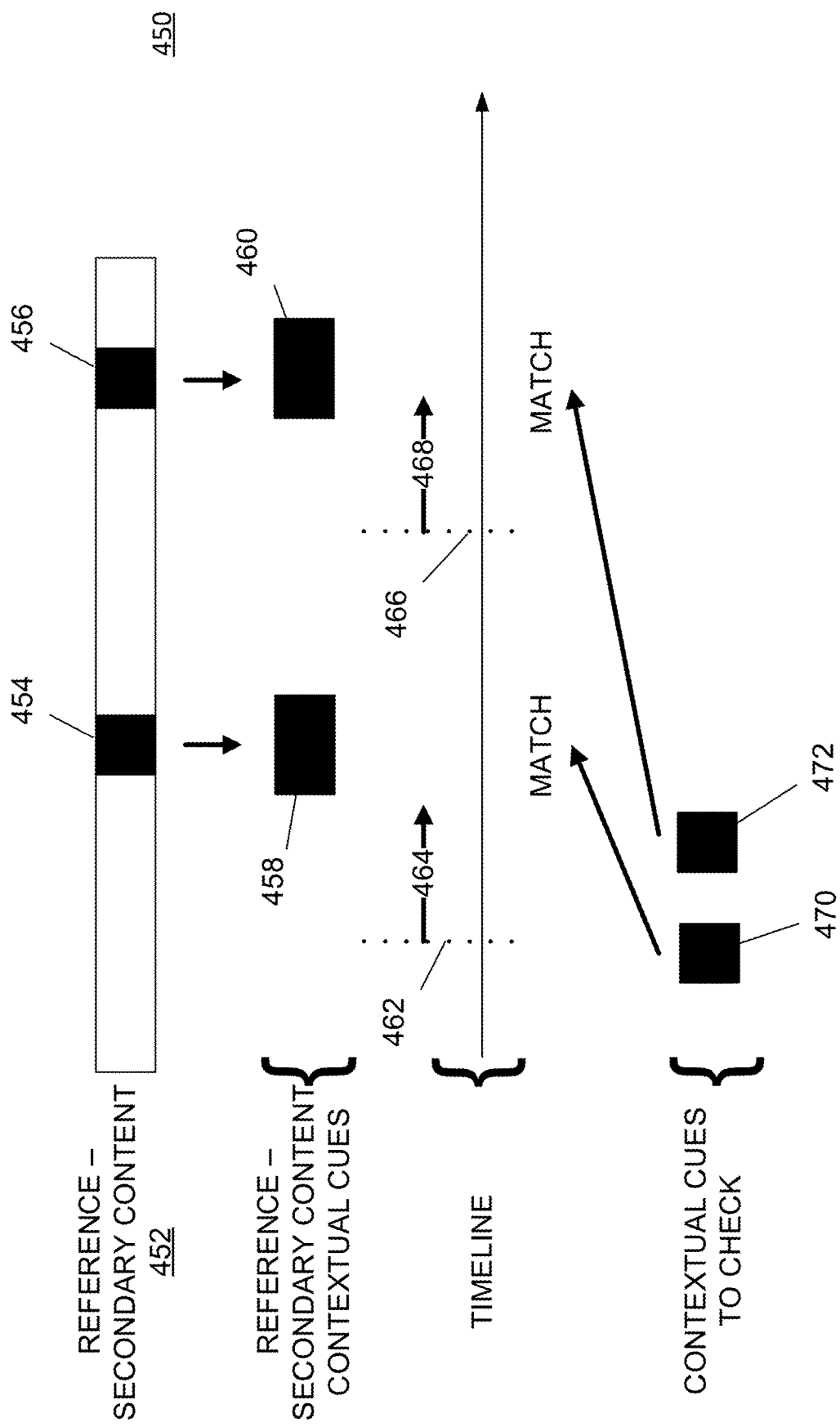
FIG. 4B depicts a sliding contextual cue comparison with secondary content, in accordance with an embodiment.

FIG. 4B depicts a sliding contextual cue comparison with secondary content, in accordance with an embodiment. In particular, FIG. 4B depicts comparison 450. The comparison 450 comprises secondary content of a reference stream 452, detected transients 454 and 456 and respective reference secondary content contextual cues 458 and 460, time of reference content primary cues 462 and 466 and the respective relative time differences between the primary contextual cue and the secondary content contextual cue 464 and 468, and contextual cues to check 470 and 472. The reference stream may be available with several sensor modalities, or only the contextual cues with associated timing information may be available to perform a comparison between the reference content and the content to check. If only the reference content is available, the contextual cues and timing information can be extracted from the reference content as discussed in this application. A similarity check between the reference content and the content to be checked may be performed by comparing the contextual cues associated with each content stream. The detected transients can include any of the transients discussed throughout this application.

The similarity check can include applying a cross-correlation scheme or a comparison of detected SSIDs (Service Set Identifiers) of one or more wireless signals. The delay mismatch of the sparse events of the secondary content is verified in the same methods of primary content. If pulses with similar amplitudes are located at the same time instants, and the event is temporally similar, the correlation between the reference content and the content to be checked is established. Once the correlation is established, the content to be checked can be associated with the known event associated with the reference content.

Contextual cues, or contextual watermarks, from various media streams ensures the content from individual users and possible event organizers are captured from the same target in the same location time window.

In accordance with an embodiment, contextual cues associated with an event are captured, stored, and transmitted with a media stream capture of the event. The contextual cues may be utilized to verify a location, time, or environmental conditions, and associate multiple different media streams with each other.

The association of media streams with each other may be used to prove originality or integrity of a video's source. This comparison of contextual cues can verify the content integrity as well as a user's interest or commitment in an event. An event organizer, or someone associated with an event, can detect the number of different media captures associated with the event, which can be time bound, location bound, or both.

Both primary and secondary contextual cues can be used to detect modifications to the primary content. Detecting of modifications to the primary content is enabled because the secondary content contextual cues are linked to the primary content contextual cues by the relative time difference.

The content to be checked does not need to be bit exact and noise free, as compared to the reference content using identification by contextual information. Searching for distinct events using contextual cues allow variations in the capabilities of capturing devices, allowing for noisy measurements and distortions in recordings.

Figure 5:
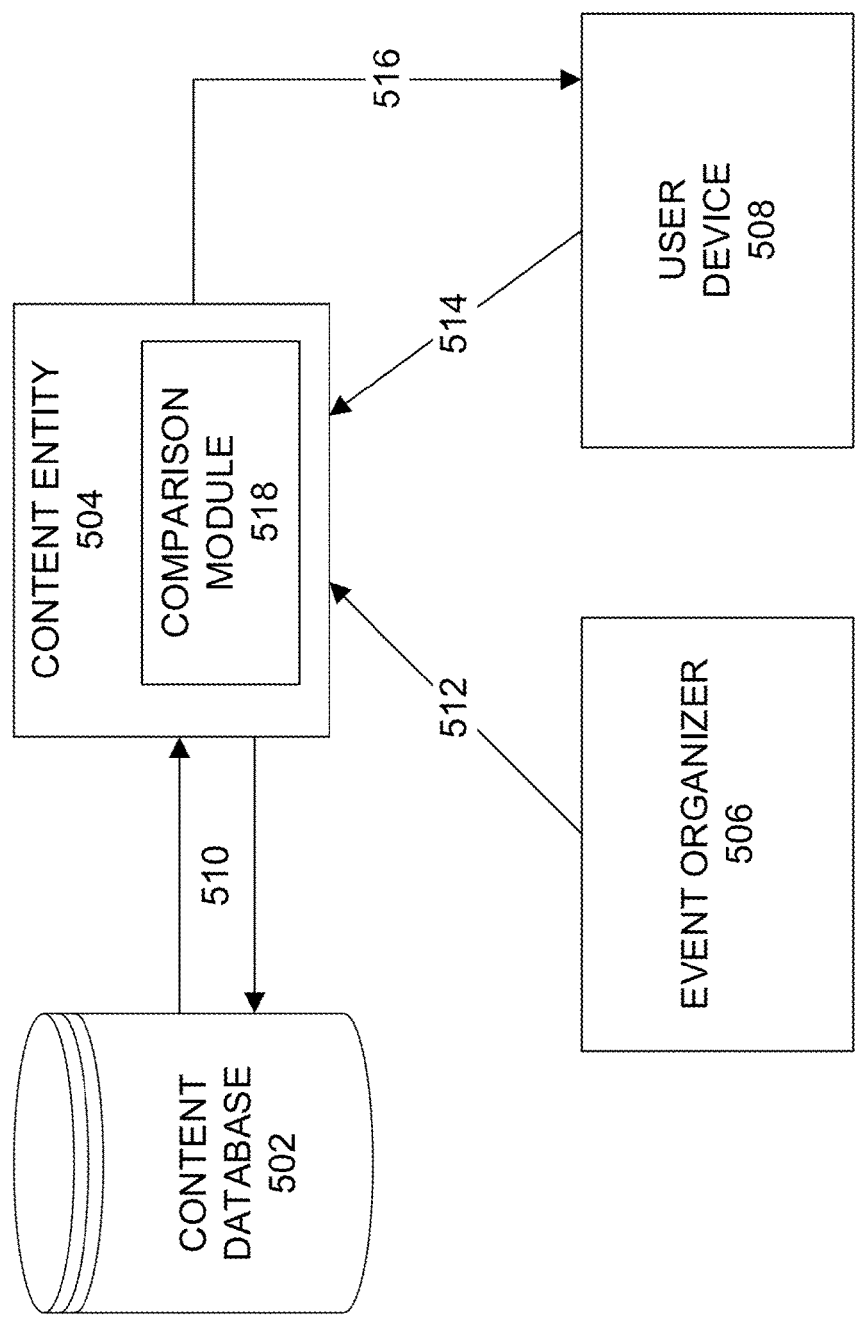
FIG. 5 depicts an overview of associating media streams, in accordance with an embodiment.

FIG. 5 depicts an overview of associating media streams, in accordance with an embodiment. In particular, FIG. 5 depicts the overview 500. The process 500 includes a content database 502 communicatively coupled to a content entity 504 having a comparison module 518 via communication link 510, an event organizer 506 communicatively coupled to the content entity 504 via the communication link 512, a user device 508 communicatively coupled to the content entity 504 via the communication link 514. The event organizer 506 may be any collective set of sensors controlled and operated by the event organizer 506. The user device 508 may include an electronic communication device operating to record video and contextual data with an application configured to interact with the content entity 504. For example, the user device 508 may be a smartphone operating a video recording application configured to upload media content to the content entity 504.

In the overview 500, both the event organizer 506 and the user device 508 upload a content stream via their respective communication links 512 and 514 to the content entity 504. The uploads include contextual cues as reference, to the content entity 504. The content entity 504 is configured to receive the media streams. As depicted in FIG. 5, the content entity 504 includes the comparison module 518, although, the comparison module may be separate from the content entity 504. The comparison module 518 is configured to compare, for each media stream, the reference sensor data with the respective embedded contextual sensor data to identify streams generated at the propriety event. For example, the comparison module 518 compares the reference sensor data received from the event organizer 506 to each media stream received from the user device 508. Some examples of the content entity 504 include the Periscope.tv application and Meerkat, though other content entities could be used, such as YouTube. The content entity 504 may be configured to further broadcast or transmit the media streams to other electronic devices over a communications network either real-time or delayed. The content entity is further configured to store the content streams in the content database and check the content database for other content streams that may be associated with the event. When a content stream is associated with the event, additional metadata can be linked, and the content entity may alter its transmissions based on the association with the related media stream.

For example, the event organizer 506 uploads a content stream and associated primary and secondary contextual cues to the content entity 504. The content entity 504 stores the content stream and associated contextual cues in the content database 502. Additionally, the user device 508 uploads a media stream, the user's media stream was taken at the same location and time as the content stream uploaded by the event organizer 506. The user's media stream and associated contextual cues are stored in the content database 502. The comparison module 518 performs a comparison automatically upon upload to the content entity 504, or a query of the content database 502 can be later performed to match media streams based on the contextual information. The user's media stream is associated with the event organizer's media stream, as discussed in this application, and the user's video stream is associated with the event organizer's media stream.

Additional metadata can be shared between the user device 508 and the event organizer 506 via the communication link 516. For example, the event organizer 506 can learn the name and identity of the user device 508, and the user device 508 may be provided with information identifying other users' media streams that are also associated with the event organizer 508.

Further, the content entity 504 may take certain actions based on the association. One example is to cease the rebroadcast, storage, or subsequent re-transmission of a user's video stream based on an association with an event organizer's media stream. One example would be an event organizer of a professional sporting game uploading live content of the sporting game to a content entity such as Meerkat and a user recording and uploading to Meerkat a media stream taken at the professional sporting event against the terms and condition for attendance of the professional sporting event. The content entity can associate the user's media stream with the content owner's media stream based on the contextual cues, and prevent real-time transmission of the user's media stream. The user's media stream may be recorded in the content database and released for subsequent retransmission at a later time, or blocked from future uploads associated with the user. These actions can assist the content entity to enforce digital rights management (DRM) of the event organizer. Additionally, the comparisons between the event organizer's media stream, and any other media stream associated with the event, can be utilized to determine a level of interest in the event.

In accordance with an embodiment, a contextual watermark is utilized with media content. In a first step a primary multimodal content, comprising one or more different modalities such as audio and video, is characterized by determining an additional sparse event vector from the content. The sparse event vector may be created in a discrete Fourier or wavelet domain, or any similar method. A compressed sensing approach may be applied to the sparse data to create a set of low bit rate contextual cues. Additionally, another set of sparse and compressed domain contextual cues are determined using one or more additional modalities captured simultaneously with the primary content. Alternatively, the secondary content is sampled from the original content applying a band-passed signal with different threshold functions to that of the primary contextual cues. The contextual cues of both original content as well as additional secondary information are stored as metadata, payload header, or additional data field of the media content.

In a second step, the primary contextual cues are at least partly determined from the captured content. Thus, the metadata or payload header containing the contextual cues cannot be copied from another media stream and cannot be modified without detection, because the contextual cues cannot be copied from another media stream and cannot be modified since the cues can always be reproduced from the available reference content for comparison purposes.

In a third step, the contextual cues are extracted from the secondary content, and are stored relative to the corresponding contextual cues from the primary content. The time line of the sparse domain parameters determined form one or more additional modalities are represented relative to the cues extracted from the primary contextual cues. Thus, the reconstruction of additional contextual cues requires information about the primary content cues.

In a fourth step, recording of contextual cues may be limited by use of a trailing period. When a contextual cue is extracted, the next contextual cue cannot be extracted until after a trailing period has elapsed. The duration of the trailing period can be determined by a variety of methods, including increasing the trailing period duration to limit the size and bit-rate of contextual cue metadata. The trailing period can be applied to either one or both of the primary content contextual cues or the secondary content contextual cues.

In a fifth step, the trailing period of the primary content has a service-specific predefined minimum and maximum values. In order to reproduce the contextual cue data set, the predefined limits are available also when comparing the cues against the reference content.

In a sixth step, modification of original content, or any of the attached contextual cues, is detected by comparing the contextual information against the original reference content, or any other material captured in the same location from the same source. If the primary content contextual cues are corrupted, the comparison against a reference content will not match. Also, checking secondary content cues reveals any timing modifications or timeline corruption of the content as well as the difference in the environment and location the recording took place.

Figure 6:
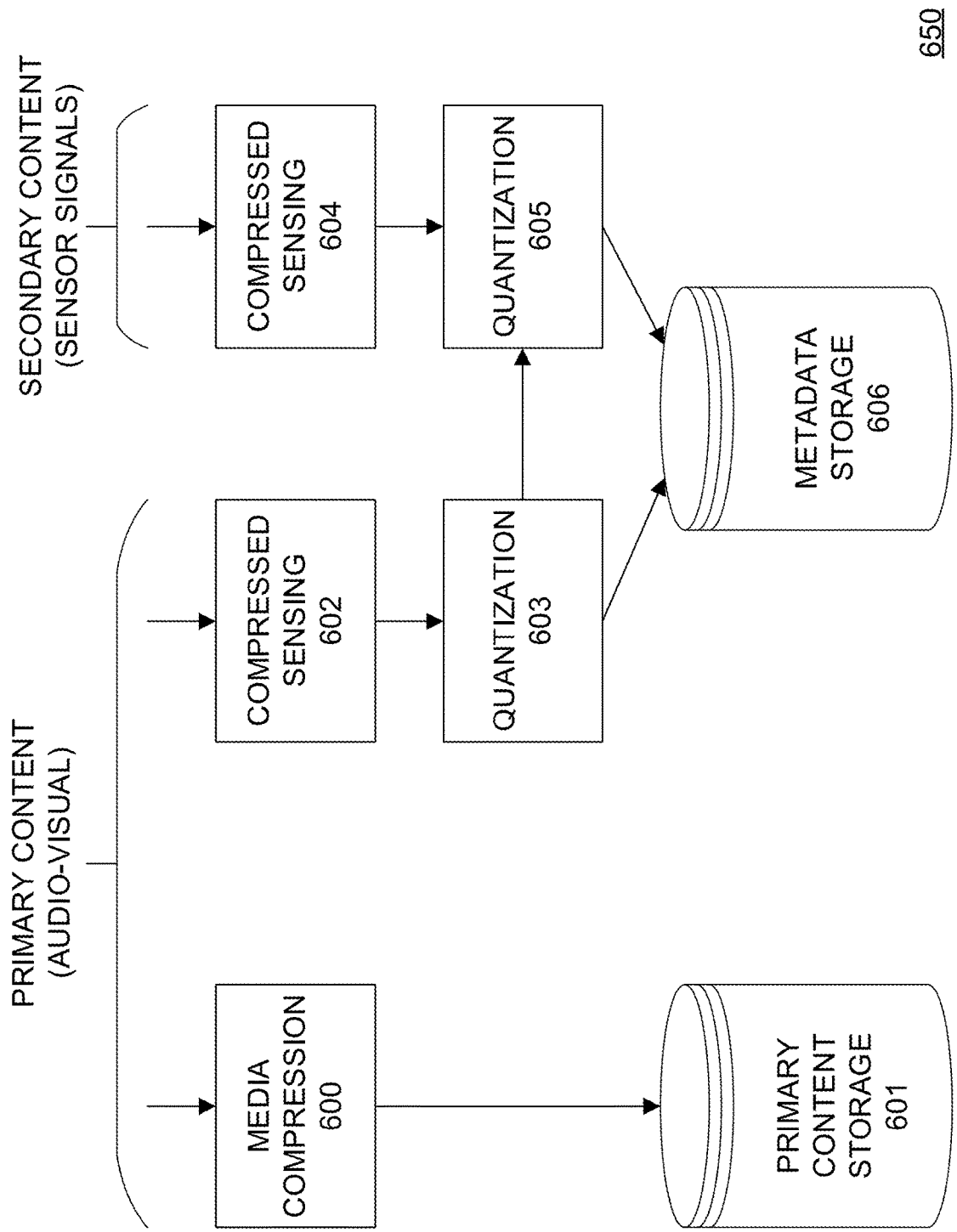
FIG. 6 depicts an example contextual cue extraction process, in accordance with an embodiment.

FIG. 6 depicts an example contextual cue extraction process, in accordance with an embodiment. In particular, FIG. 6 depicts the process 650. The process comprises primary content (e.g. audio-visual) and secondary content (e.g. sensor signals), media compression 600, primary content storage 601, compressed sensing 602, quantization 603, compressed sensing 604, quantization 605, and metadata storage 606.

In the process 650, contextual cues are extracted from a media stream recorded by an electronic device to facilitate a contextual similarity check. The contextual cues may be associated with a predefined set of sensors. The primary content is conveyed to a media compression 600. The media compression 600 compresses the audio-visual content with a dedicated algorithm and stores the primary content in the primary content storage 601. The primary content storage 601 may reside on the local memory of the electronic device or in a network based database. The contextual cue estimation algorithm finds all the transients and special events of the primary content exceeding the predefined thresholds at compressed sensing 602. The extracted primary cues are then compressed and coded with dependent timing information at quantization 603. The quantization 603 also has a trailing period that limits extracting cues from consecutive transients occurring within the trailing period. The extracted and compressed contextual cues, with corresponding time stamps are attached as metadata or payload header information in metadata storage 606. The quantization 603 also sends timing information of the primary contextual cues to the quantization 605.

The electronic device simultaneously detects and records a plurality of sensor signals as secondary content. A sparse domain signal processing is applied to the secondary content and compresses the sensing methods to store the secondary content contextual cues at compressed sensing 604. The device searches events and transients in the sensor signals and applies compressed sensing. The detailed process of extracting secondary contextual cues may be conducted using any of the methods of extracting secondary contextual cues discussed in this application. The secondary content contextual cues are quantized at 605 before storing in metadata storage 606. In the case that the secondary content consists of a limited set of code words detected in a radio beacon, the further quantization may be omitted. Each set of secondary content contextual cues are associated with timing information received from the quantization 603 associated with the primary content contextual cue timing information and the relative time between the primary content and secondary content contextual cues. Thus, the secondary contextual cues stored in the metadata storage 606 do not have absolute timing information.

The process 650 can apply to both a reference content stream and a comparison content stream to facilitate a comparison between the two streams based on the contextual cues. To perform a similarity analysis of a comparison content stream to a reference content stream, only the metadata of the reference content stream is used.

Figure 7:
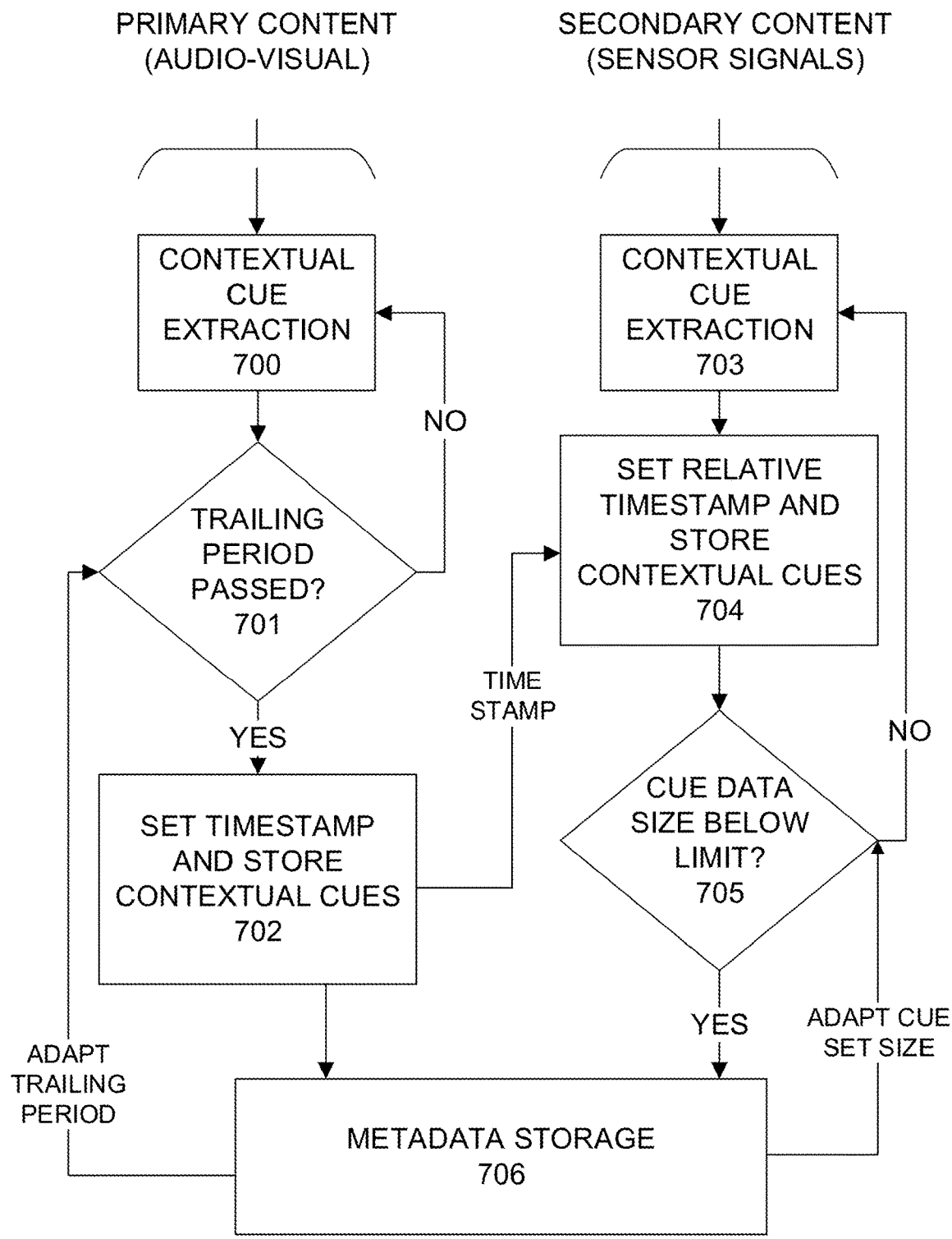
FIG. 7 depicts a contextual cue management process, in accordance with an embodiment.

FIG. 7 depicts a contextual cue management process in accordance with an embodiment. In particular, FIG. 7 depicts the process 750. The process 750 comprises primary content, a contextual cue extraction 700, a trailing period check 701, a set timestamp and store contextual cues 702, secondary content, a secondary content contextual cue extraction 703, a relative timestamp 704, a cue data size check 705, and metadata storage 706.

In accordance with an embodiment, the storage of contextual cues of the primary and secondary content in the metadata database is adaptive. One method is to adjust the trailing period and the number of cue sets in the secondary content. The trailing period may have set minimum and maximum values. The process 750 may be utilized to adapt the metadata.

The contextual cues of the primary content and the secondary content are extracted at steps 700 and 703, respectively. The cues may be extracted whenever a transient, or an event, is detected in the signals. The transient or event may also be compared to a threshold to trigger the creation of a contextual cue. If the trailing period of the previously detected contextual cue has not elapsed (step 701), a new contextual cue is not stored in the metadata. A timestamp is attached to the primary content contextual cues at 702.

The timestamp data attached to the primary contextual cue is utilized at 704 with respect to relative timing of the secondary content contextual cues. At 704, the secondary content contextual cues are analyzed and a differential timestamp is attached to secondary content contextual cues.

The differential timestamp may be determined by subtracting the time of the primary content contextual cue from the secondary content contextual cue. At 704, the available set of contextual cues is processed and the differential timestamp is associated with the set of contextual cues. The secondary contextual cues each are associated with a unique timing information linked to the primary content timestamp.

The metadata storage size and the data rate is controlled by managing the trailing period of the primary content contextual cues and the number of secondary cue sets linked to each primary content time stamp. If the overall data size in the metadata storage or the data rate exceeds a threshold, the trailing period duration is increased and the number of cue sets of the secondary content is reduced. These adjustments may occur incrementally. If the metadata storage size is not sufficiently big, the trailing period duration may be decreased and the number of possible cue sets of secondary content may be increased.

Figure 8:
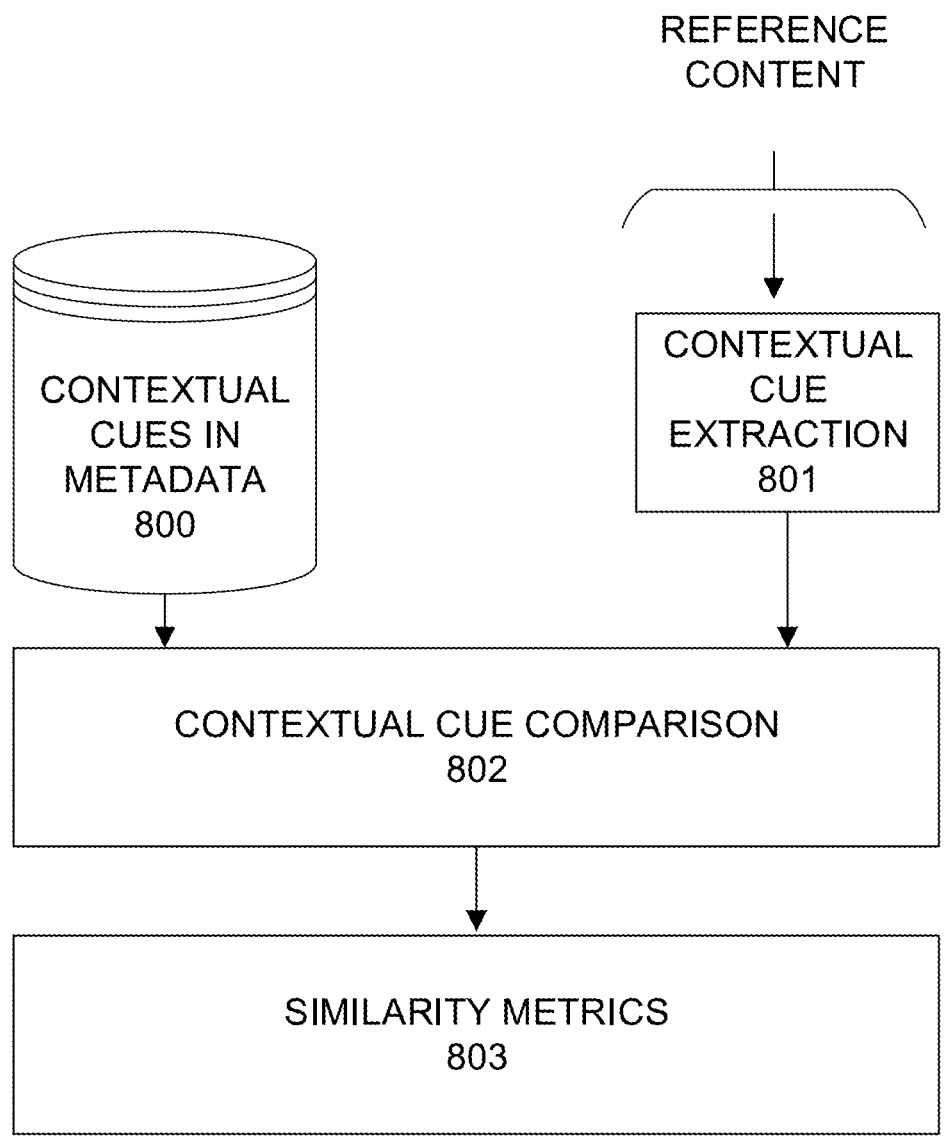
FIG. 8 depicts an example comparison process, in accordance with an embodiment.

FIG. 8 depicts an example comparison process, in accordance with an embodiment. In particular, FIG. 8 depicts the process 850. The process 850 comprises contextual cues in metadata 800, a reference content stream, a reference content contextual cue extraction 801, a contextual cue comparison 802, and similarity metrics 803.

In the process 850, contextual cues in metadata 800 are associated with a media stream are compared at 802 with the contextual cues extracted from the reference content at 801. Similarity metrics 803 are produced to determine if the two content streams are associated with each other. The comparison at 802 may determine a cross-correlation value between at least a portion of the embedded contextual sensor data and the reference sensor data. The similarity metric 803 may set various thresholds, and when the comparison of 802 exceeds one of the set thresholds, the streams are determined to be from the same source.

The time-domain sparse event similarity measurement is conducted by determining the correlation of sparse events from two different content streams. The comparison can be made between a reconstructed sparse domain signals after the compressed cues are reconstructed. In another embodiment, a cross correlation of the reconstructed time domain signals or compressed cues may be used. For example, when a maximum correlation within a time frame of one second is greater than 0.5, the signals can be considered as containing the same captured event, and thus the cues are classified as locating within the same contextual location.

Figure 9:
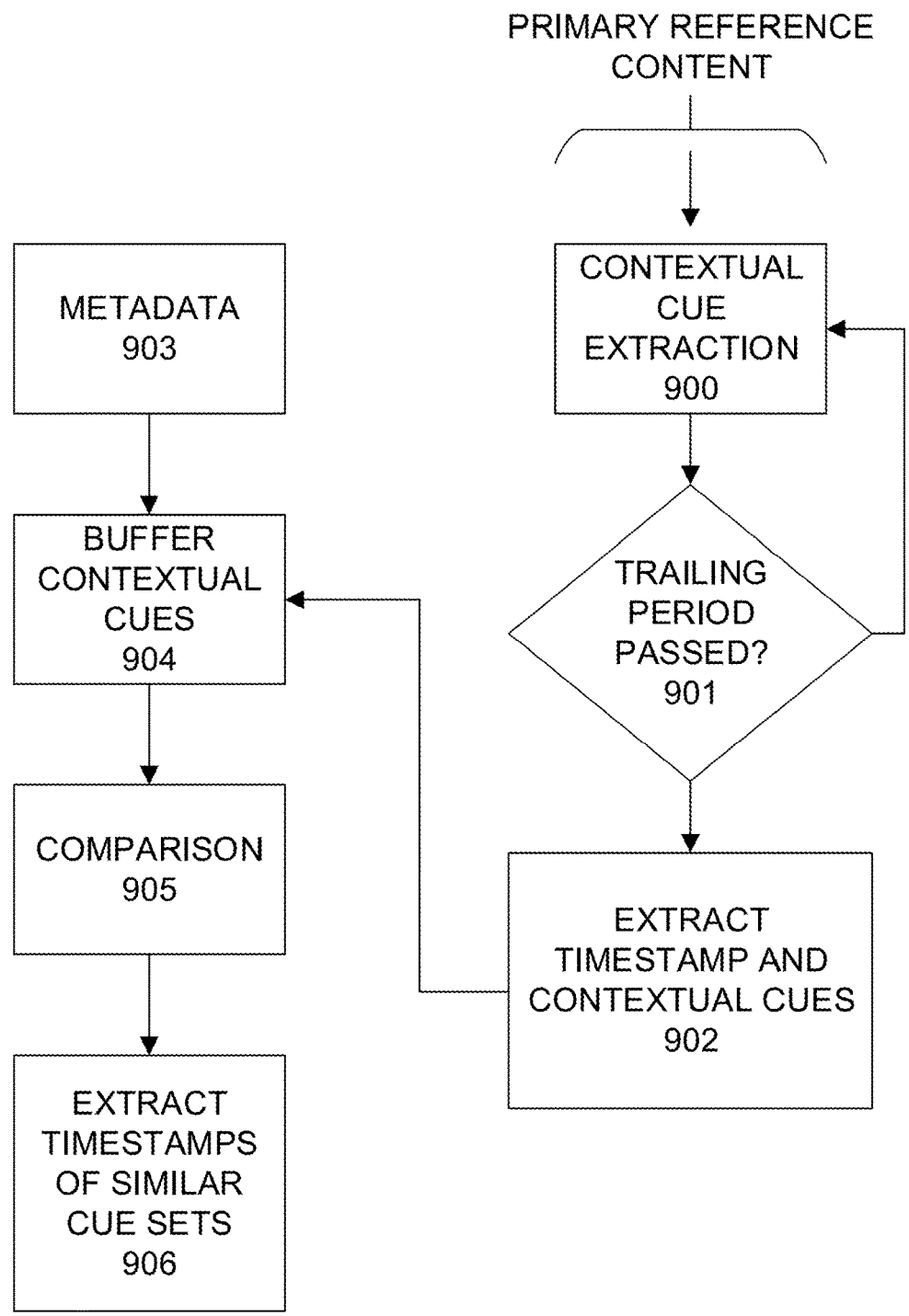
FIG. 9 depicts an example comparison process to extract absolute timestamps, in accordance with an embodiment.
Figure 10:
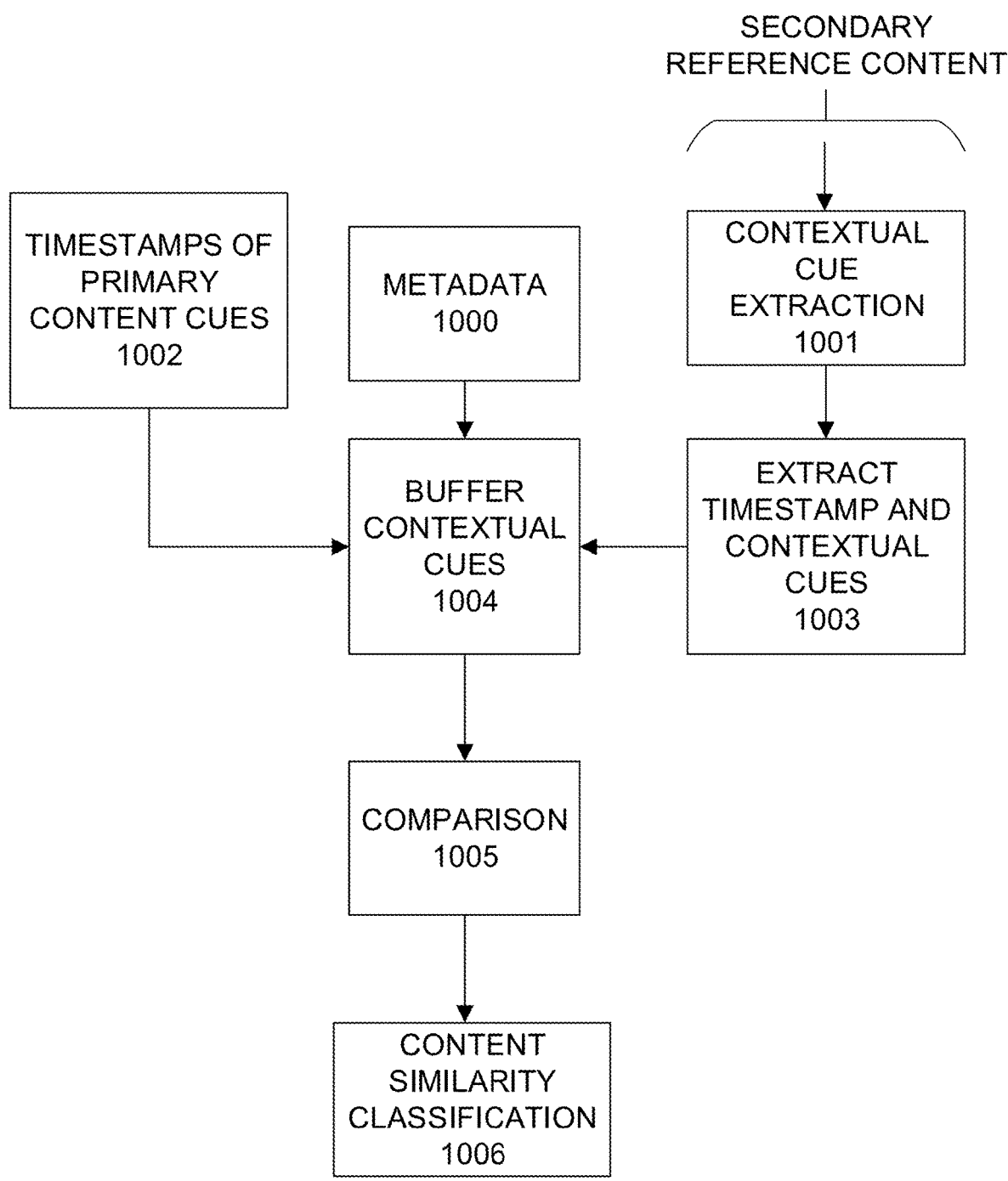
FIG. 10 depicts a contextual cue comparison process, in accordance with an embodiment.

Embodiments of the comparison process described in process 850 are described in more detail in conjunction with FIGS. 9 and 10.

FIG. 9 depicts an example comparison process to extract absolute timestamps, in accordance with an embodiment. In particular, FIG. 9 depicts the process 950. The process 950 comprises primary reference content, contextual cue extraction at 900, a minimum trailing period check at 901, a timestamp and contextual cue extraction at 902, metadata at 903, a contextual cue buffer at 904, a comparison at 905, and a timestamp and similar cue set extraction at 906.

In the process 950, a primary content comparison is conducted by running the primary reference content through the contextual cue extraction process as the service user at 900. The trailing period of the extraction process is set to a service specific minimum, and may be adjusted as disclosed in this application. This may result in the number of extracted contextual cues to be higher than in the metadata 903. Thus, the contextual cues from the metadata and reference content are buffered at 904. Timestamps and contextual cues from the reference content are extracted at

902. When the absolute time stamps are not stored with the contextual cues, a sliding comparison check, per process 400 of FIG. 4A, may be utilized. In embodiments with a trailing period of the reference content shorter than that of the compared content, the reference content contains more cues, some of which will not correlate to the compared content contextual cues. Thus, a comparison algorithm may discard any cue that does not match the contextual cues of the compared content and has a time difference shorter than the maximum trailing period time. When the time difference is more than the maximum trailing period duration, the possible trailing period time adaption does not alter the analysis, and mismatched cues indicated the content streams are not associated with the same event. When similar cues are detected at 905, the corresponding time stamps are extracted together with the knowledge of their similarity at 906. The timestamps can be used in comparison of the secondary content contextual cues.

FIG. 10 depicts a contextual cue comparison process, in accordance with an embodiment. In particular, FIG. 10 depicts the process 1050. The process 1050 comprises metadata 1000, secondary reference content, contextual cue extraction of the secondary reference content 1001, extraction of timestamp and contextual cues of the secondary reference content 1003, timestamps of primary content contextual cues 1002, buffering contextual cues 1004, a comparison 1005, and content similarity classification 1006.

In the process 1050, the secondary content contextual cues are stored in metadata storage (1000), and the reference timestamps of the primary content are available from the primary content comparison presented in FIG. 9 in block 902.

The reference secondary content is run through the same context extraction as the user content at 1001. The contextual cues with corresponding timestamps are collected and stored in the buffer together with the compared cues at 1004. As the primary content timestamps are known, the relative timing information corresponding to numbered primary content cues can be converted to absolute timing information in the buffer at 1004.

Figure 11:
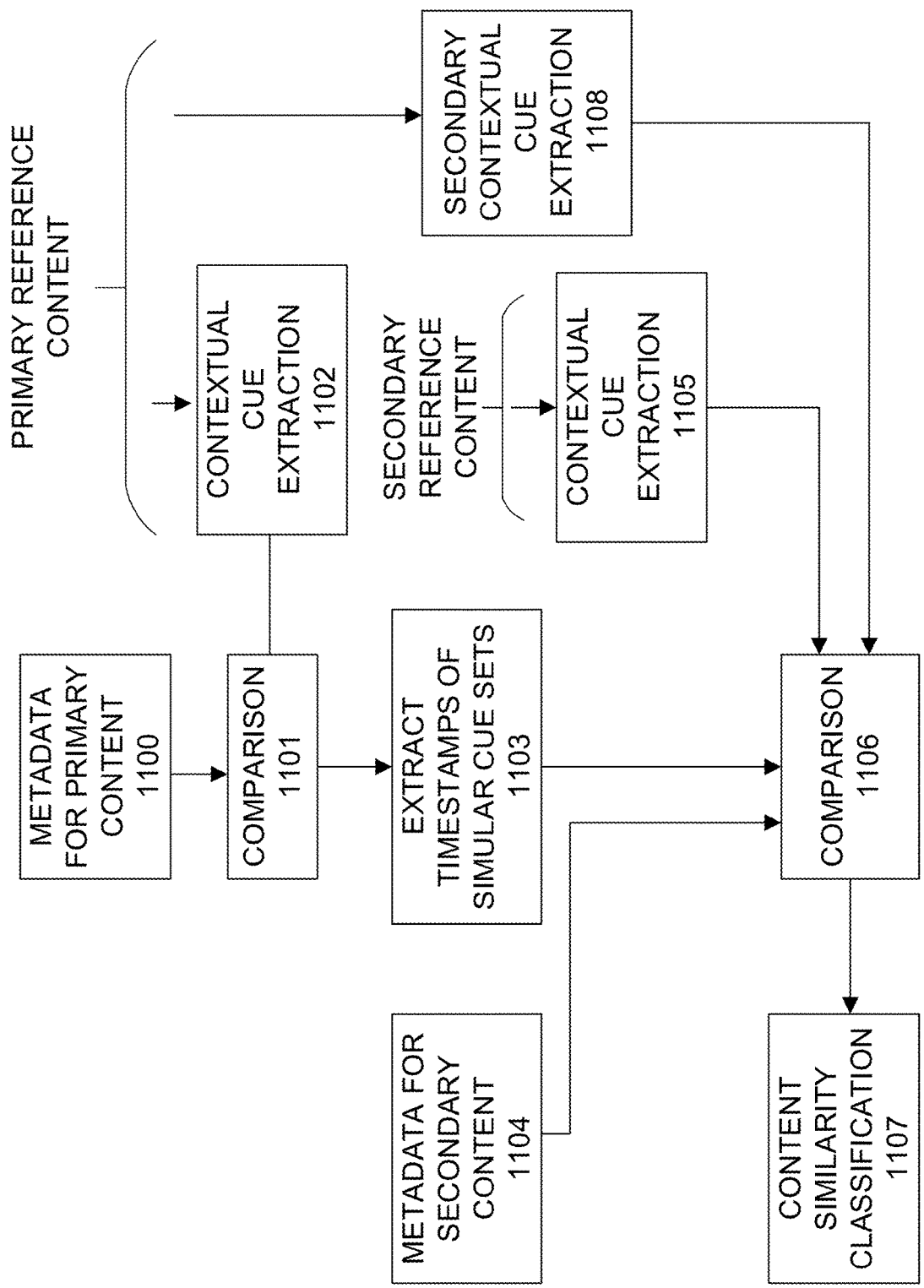
FIG. 11 depicts a content comparison process, in accordance with an embodiment.

When the buffer 1004 has both the test content cues and the reference content contextual cues in the buffer with timing information, the comparison can be performed using a correlation function in 1005. When sufficient number of secondary content cues have a match with the reference material, the compared content can be considered to match, or be associated with, the reference material FIG. 11 depicts a content comparison process, in accordance with an embodiment. In particular, FIG. 11 depicts a process 1150. The process 1150 comprises primary reference content, metadata for primary content 1100, contextual cue extraction 1102, a first comparison 1101, a timestamp and similar cue set extraction 1103, metadata for secondary content 1104, secondary reference content or event information, contextual cue extraction 1105, secondary contextual cue extraction 1108, a second comparison 1106, and a content similarity classification 1107.

The content comparison may be performed in two comparison checks, as depicted in the process 1150. In the first comparison check (1101), the primary content is checked, after which the results of the first comparison are applied to a secondary content comparison (1106).

In the process 1150, the contextual cues are extracted from the reference content at 1102 and compared to the metadata of the primary content 1100 at the first comparison 1101. The first comparison 1101 compares the extracted contextual cues 1102 with the primary content metadata 1100 and provides a classification flag indicating whether the primary content has a match, and provides timing information for the contextual cue locations on the time line at 1103. A primary content match, or the presence of the classification flag, at 1101 initiates continuation to the second comparison 1106. The timing information from the comparison 1101 is used to extract the secondary content contextual clues at 1105. The secondary contextual clues extracted at 1105 are compared to the metadata for the secondary content from 1104 at the second comparison 1106. The content similarity classification at 1107 is used to determine if the primary and secondary content streams are associated with each other.

In an embodiment in which a reference content owner, such as an event organizer does not have secondary contextual signal and/or additional sensors available, the second comparison 1106 is conducted with indirect measurements or overall knowledge and design of the event. Indirect comparison may include comparing a user's sensor signal and events found in the signal against the event organizer's design. For example, a timing plan for availability of Wi-Fi hot spots, or changes in SSID naming provides a data stream that can be compared against the detected radio environment in the user's secondary content. In this case, the timing plan is provided to the contextual cue extraction at 1105, which is configured to extract secondary contextual cues from a content stream or from event knowledge. The changes in the radio environment detected by the electronic device associated with the content stream are embedded in the metadata for the secondary content at 1104.

In the process 1150, the secondary contextual cue extraction at 1108 determines the secondary reference contextual cues from the primary content. This type of contextual cue may be, from example, room reverberation. The contextual cue extraction at 1105 handles both secondary sensor as well as indirect information cues. Additional sensor modalities and indirect comparisons may be performed utilizing the framework of the process 1150, as discussed in this application.

In an embodiment where an event organizer does not have secondary sensor signals, reference cues are extracted at 1108 using the primary reference content. Room reverberation may be determined by an estimate using the audio stream. In this case, the estimation is done from the user's content.

In another embodiment where an event organizer does not have secondary sensor signals, the indirect sensor cue could be general information about the event at 1105. For example, the timing plan for different effects, (e.g. in the radio environment, provide timestamps when comparing events extracted from received radio signals). The event design data is forwarded as secondary reference content at 1105. Additionally, the indirect information may contain a timing plan for special effects that are unique for the given event. Hence, the information to the block 1105 comprises timestamps of the effects. The contextual similarity is detected by comparing the given timestamps against the timing of the detected events extracted at 1104. The data of 1104 is associated with both the actual sensor signal events and the timing information of these events.

In accordance with an embodiment, secondary cues can be used by the second comparison 1106. These secondary cues include, but are not limited to: sensor data from the user's data stream (1104); sensor data from the reference data stream (1105); sensor data from the reference data stream in the absence of event organizer sensor data (1105); indirect information related to event timing plans and details about the venue, special effect timing, and design (1105); secondary cues calculated from the primary content (1108); and data from 1105 and 1108 applied simultaneously in comparison against a user's sensor data (1104).

In the process 1150, the secondary cues to be compared at 1106 depend on available sensor modalities. In one embodiment the secondary contextual cues from a user's electronic device include both a first sensor and an audio direction of arrival cue. The example first sensor may contain air pressure data. In this case, the comparison at 1106 utilizes at least one of the corresponding modalities in secondary reference content of 1105 or secondary contextual cues of 1108. If there are no matching secondary references, the comparison is done only with data from 1108.

In an embodiment, an indirect comparison is performed. The timestamps from 1105 and 1108 are provided for events that can be detected by sensors. The timing information corresponds to events in motion or lighting conditions. In this case, the comparison is done against events detected by accelerometer or ambient light sensors.

In an embodiment, a direct comparison is performed. The direct comparison may be performed with radio detections. Both the content owner as well as the event organizer has metadata relating to wireless signal conditions. The example wireless signals include WiFi hot spots, Bluetooth-enabled devices, radio beacons, and the like. The event organizer may also have a predefined plan for changing the SSID code of the available WiFi hot spot. The content owner's metadata that detects the same wireless conditions is then compared against the content owners in the direct comparison.

Figure 12:
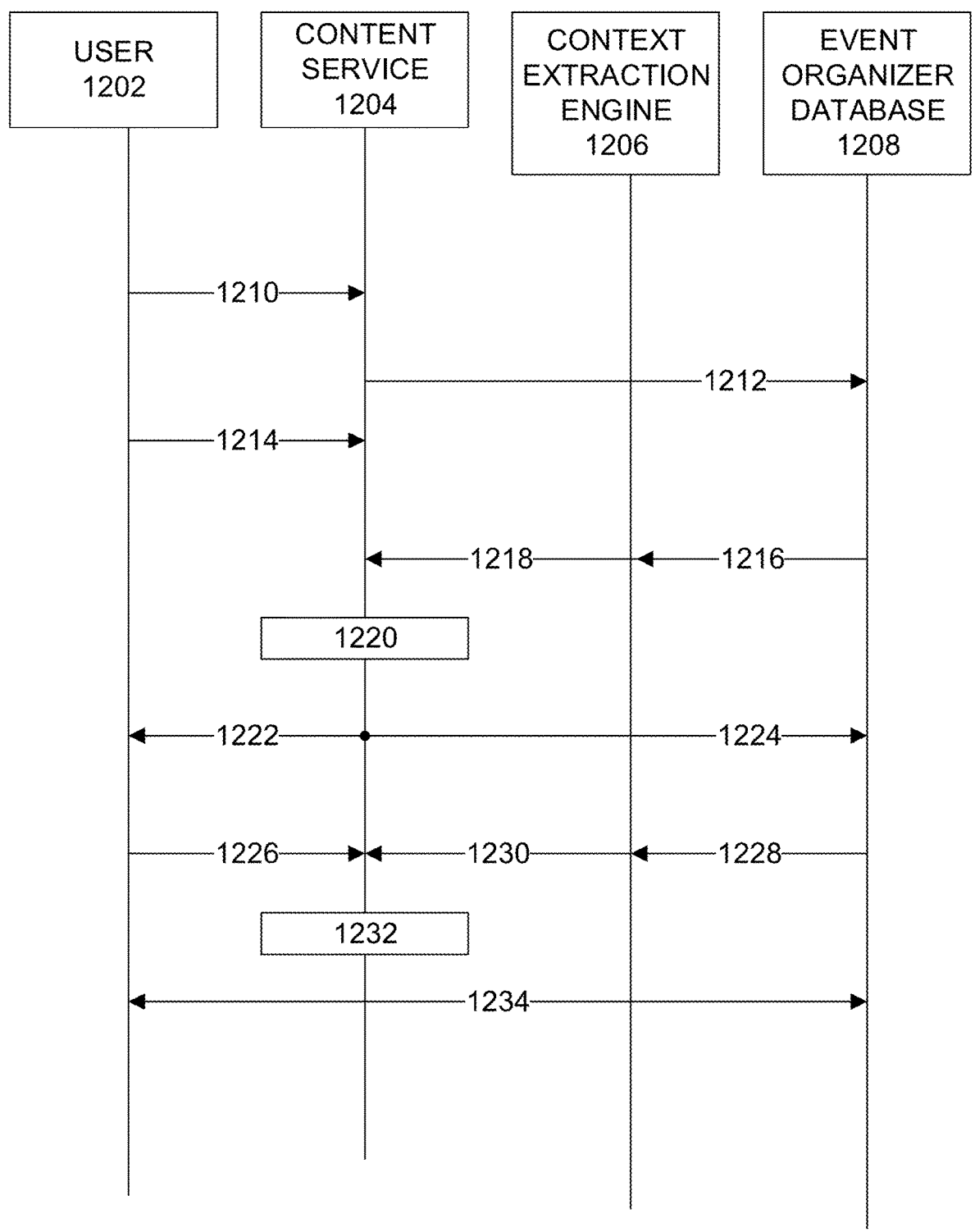
FIG. 12 depicts a process to link a user with an event organizer, in accordance with an embodiment.

FIG. 12 depicts a process to link a user with an event organizer, in accordance with an embodiment. In particular, FIG. 12 depicts the process 1250. The process 1250 involves interactions among a user device 1202, a content service 1204, a context extraction engine 1206, and a database of the event organizer 1208.

The process is started by the user device 1202. The device has recorded an event, and the associated user wants to link the content to the actual event. At 1210, the user device 1202 sends a request to check a certain content of a certain event in particular location on particular time to the content service 1204. The request also contains pointers on the media modality (e.g. audio, video, picture). The content service 1204 then requests, from the related event organizer's database 1208, relevant cues to be checked. The relevant content on given time frame is provided to the context extraction engine 1206 at 1216 that constructs the primary contextual cues. Before that, the user device 1202 has provided corresponding cues related to the primary content at 1214.

The content service 1204 then conducts the comparison at 1220 and creates a similarity flag and timestamp information about the contextual events.

If the comparison is passed successfully, the content service 1204 sends a request to both the user device 1202 and the event organizer database 1208 for the secondary context information for comparison at 1222 and 1224, respectively. Similar to the primary case, the corresponding data is forwarded to the content service 1204 from the respective sources at 1226-1230. In case the event organizer's database 1208 has indirect contextual data, such as event design and timing plan for special effects, the corresponding event time information is extracted with the context extraction engine 1206. The content service 1204 conducts the comparison of the secondary content at 1232. If the comparison is successful, the content service 1204 creates a link between the user device 1202 and the event organizer database 1208 at 1234. Relevant contact information, such as the user's identity, is exchanged and the event organizer may add the user details into the database 1208. The content may then be stored in the content service 1204 as connected content.

In accordance with an embodiment, the process 1250 can be utilized to link two individual users, rather than a user with an event organizer. In this case, the content service requests primary and secondary data from different databases containing content from the different users.

The process 1250 may also be executed to detect similarities between real-time streaming videos. The real-time detection is accomplished utilizing data that is readily available simultaneously.

Figure 13:
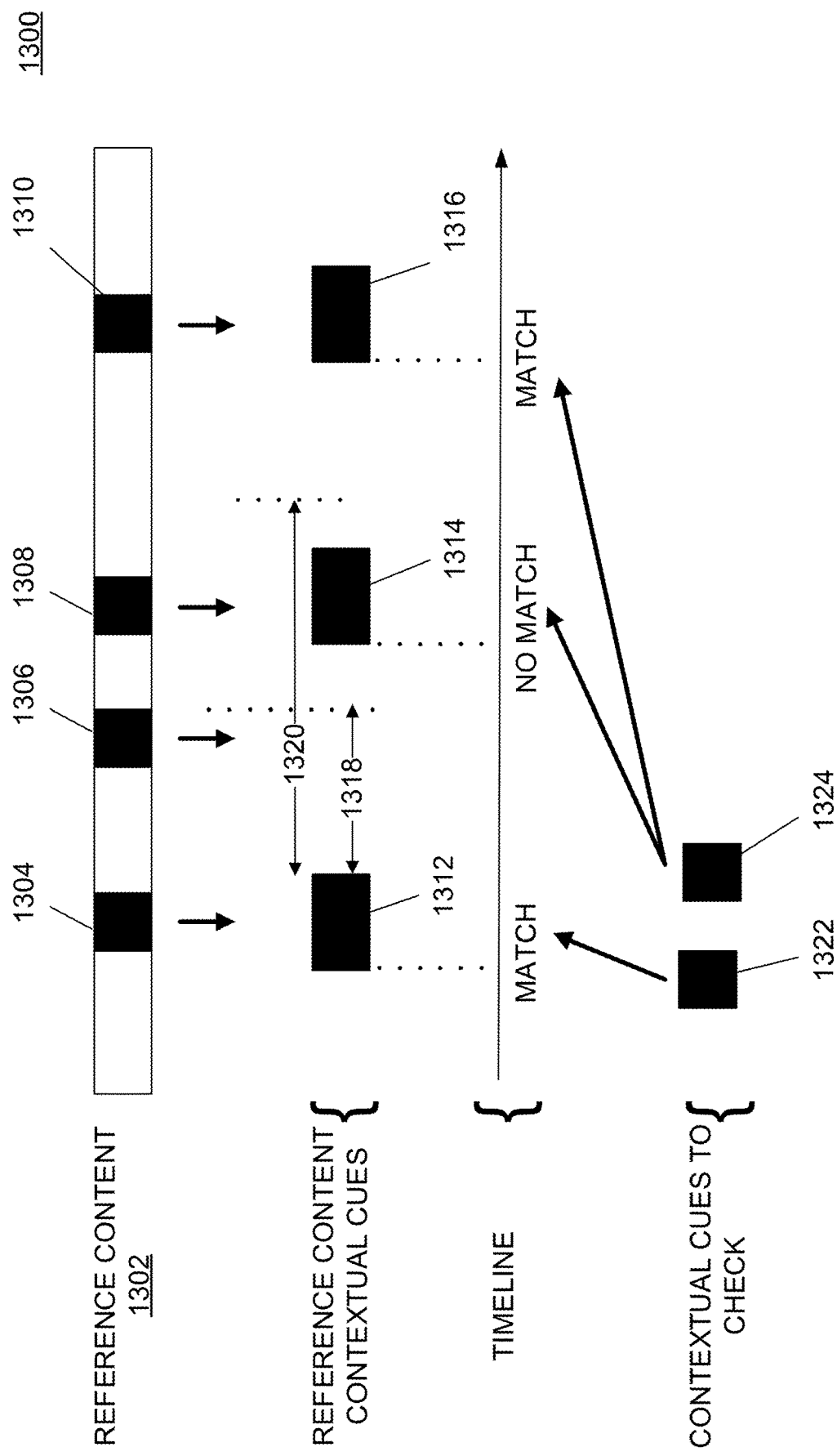
FIG. 13 depicts a comparison process with varying trailing periods, in accordance with an embodiment.

FIG. 13 depicts a comparison process with varying trailing periods, in accordance with an embodiment. In particular, FIG. 13 depicts the process 1300. The process 1300 comprises reference content 1302, detected transients 1304-1310, contextual cues 1312-1316, a minimum trailing period 1318, a maximum trailing period 1320, and contextual cues to check 1322 and 1324.

In the process 1300, the detected transients in the reference content 1302 are extracted into contextual cues. For example, the transient 1304 corresponds with the cue 1312, the transient 1308 corresponds to the contextual cue 1314, and the transient 1310 corresponds to the contextual cue 1316. The transient 1306 does not correspond to a contextual cue because it occurs before the minimum trailing period 1318 elapses. Depending on the duration of the trailing period, which falls between the minimum trailing period 1318 and the maximum trailing period 1320, the contextual cue 1314 may not be extracted from the transient 1308. Similar to the extraction performed on the content to be checked, a transient correlating with the transient 1306 may or may not be encoded into to a contextual cue to check. The first contextual cue to check is 1322, and it aligns with the contextual cue 1312 and is a match. The second contextual cue to check is 1324. In this instance, it does not match the contextual cue 1314. This could indicate that the stream associated with the contextual cues to check is not a match to the reference stream. As indicated above, the electronic device encoding contextual cues from the stream to be checked may not have coded a contextual cue associated with the time frame of the detected transient 1308 because the electronic device's trailing frame duration may be set at the maximum trailing period duration. Thus, the cue 1324 is checked against the next contextual cue 1316. If this is a match, the two materials can be considered associated with each other.

Figure 14:
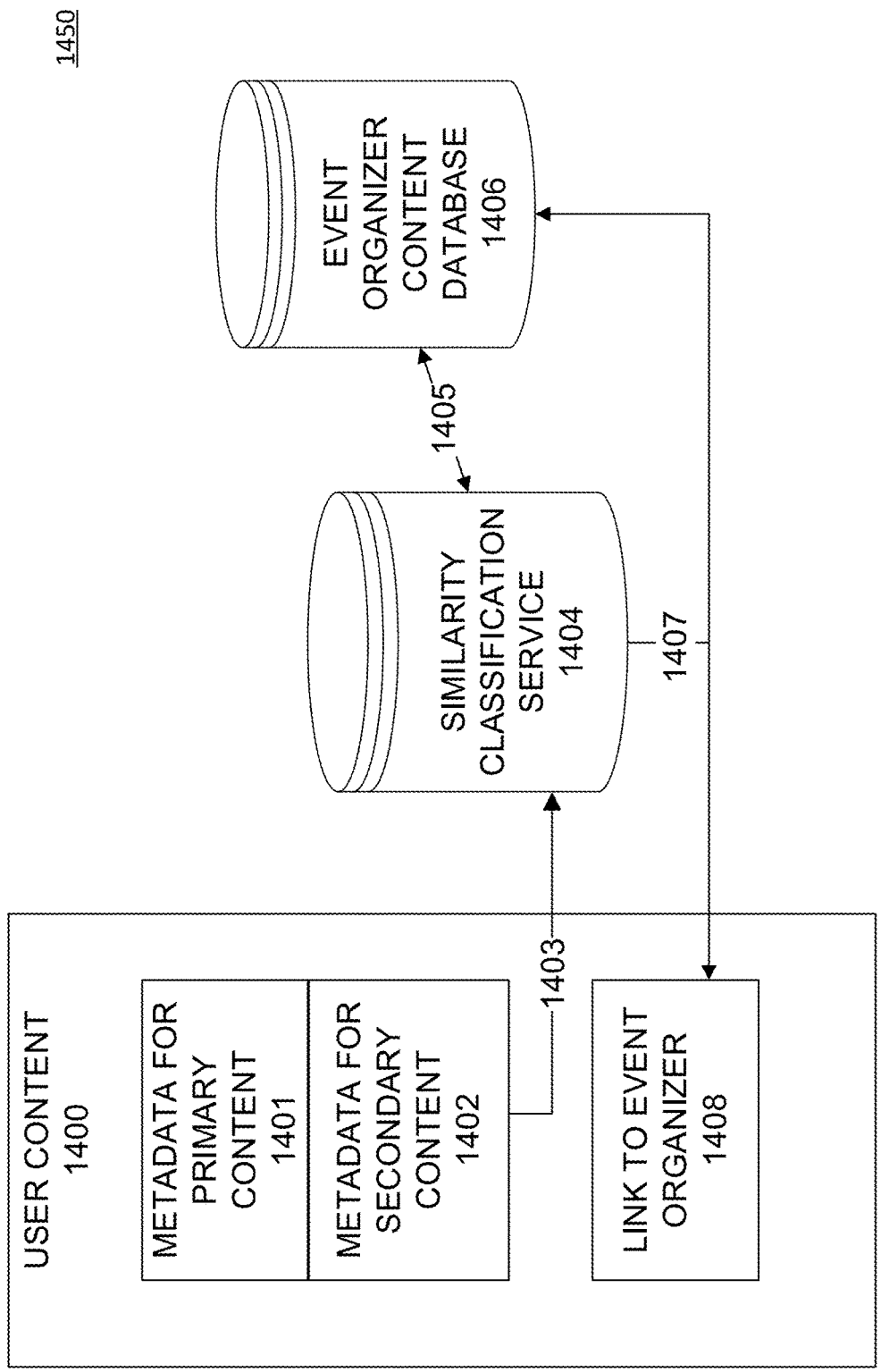
FIG. 14 depicts a process to establish a link between a user and an event organizer, in accordance with an embodiment.

FIG. 14 depicts a process to establish a link between a user device and an event organizer, in accordance with an embodiment. In particular, FIG. 14 depicts the example process 1450. The process 1450 comprises user content 1400, a request 1403, a similarity classification service 1404, a fetch info request 1405, a content database 1406, and an established link 1407. The user content 1400 comprises metadata for the primary content 1401, metadata for secondary content 1402, and a link to event organizer 1408.

In the process 1450, a user device captures content 1400, comprising the metadata for the primary (1401) and secondary (1402) content, as explained throughout this application. The user operates the device to select the content, and the device makes a request (1403) to a similarity classification service (1404). The classification service 1404 analyzes the request and fetches (1405) a set of content information from either its own database or a database associated with the event organizer (1406). The classification service compares the data and conducts the classification, utilizing primary and secondary contextual cues. The classification service receives similarity classification results as well as linking information from all participants. The classification service 1404 sends the service user device a message with a certificate of origin of the content (1407). The message also contains a link to the event organizer material 1408. The same link information is forwarded to event organizer as well. Thus, a connection between event organizer and the service user device is created. After that the user device may be in communication with the event organizer using the received certificate as proof of interest and activity. In addition, the event organizer has a link to a dedicated user for providing additional material and related content.

The process 1450 may also be performed between two individual content owners. In that case, the user device is providing the content metadata to the classification service in a similar manner. The classification service stores the data with relevant contact information in its own database and makes a search for similar content. If similar content is found, a connection between users is established. Otherwise, the content is simply stored and left of other users to make queries against.

The selection of secondary reference content may consist of different modalities. In one embodiment, the comparison may be performed between identical sensor modalities. In this case, an air pressure event detected by an event organizer is compared against an event detected by an individual with a mobile phone configured to detect air pressure changes.

In another embodiment, the comparison may be performed based on sensors with varying modalities utilizing a direct or an indirect comparison. Table 1 is a list of direct and indirect comparisons for different modality of sensors.

secondary contextual cues are connected to ensure that any difference on either of them reduces the similarity. The connection is done with time difference coding. One method of performing time difference coding is to encode the primary content contextual cues with a relative time difference to the secondary cues. Another method is to collect secondary contextual cues together with primary contextual cues.

Figure 15:
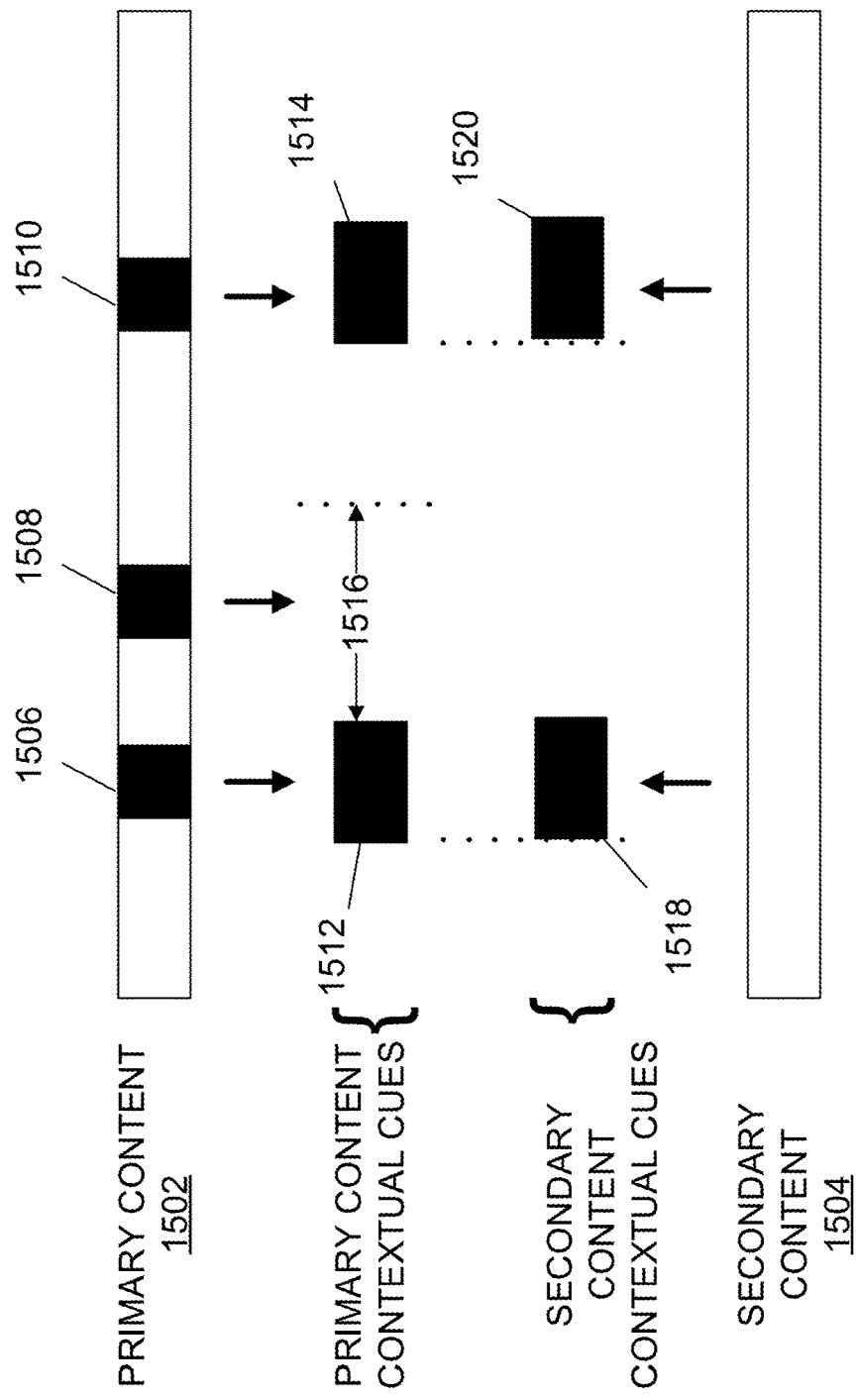
FIG. 15 depicts an example process to extract primary and secondary contextual cues, in accordance with an embodiment.

FIG. 15 depicts an example process to extract primary and secondary contextual cues, in accordance with an embodiment. In particular, FIG. 15 depicts the process 1500. The process 1500 comprises primary content 1502, secondary content 1504, transients 1506-1510, contextual cues 1512 and 1514, a trailing period 1516, and secondary content contextual cues 1518 and 1520.

The process 1500 can be used to collect secondary contextual cues together with the primary contextual cues. Similar to other examples, the transients 1506 and 1510 correspond to the primary content contextual cues 1512 and 1514, respectively. The transient 1508 is not encoded into a contextual cue because it occurs within the trailing period 1516. However, transients are not detected in the secondary content 1504. Instead, a secondary content contextual cue is forced-extracted from the secondary contact at the time the primary content contextual cue occurs.

In accordance with an embodiment, the contextual cue extraction occurs within an electronic device by the electronic device's applications. The electronic device is configured with various sensors, such as a camera, microphone, and the like. Data from these sensors are used to develop the contextual cues within the electronic device. The existing camera and microphone software applications may be modified to append contextual cue metadata to the captured content.

TABLE 1

Direct and Indirect Comparisons per Sensor Modality

| Modality | Direct comparison | Indirect comparison |
|---|---|---|
| Air pressure, manometer | Sensor signal comparison | Correlation with ventilation and low-frequency sound events in the location. Altitude of the location and altitude changes |
| Accelerometer | — | Correlation with visual cues on audience motions, music rhythm, low frequency audio events, and air pressure events |
| Orientation (gyroscope, magnetometer) | — | Event layout regarding event and audience relative positions |
| Temperature | Temperature comparison | Correlation with humidity and air pressure events and wind gusts in outdoor locations |
| Humidity | Sensor signal comparison | Correlation with humidity, air pressure and temperature events |
| Radio | Available access point details (Wi-Fi, BT, cellular), Wi-Fi SSID changes, radio signal strength | Radio beacon transmitting predetermined sequence, Wi-Fi SSID naming plan, cellular network details |
| Ambient light and proximity | — | Outdoor-indoor classification, correlation with visual effect plan |

In accordance with an embodiment, the contextual cue analysis is implemented without sparse sensor signals and a compressive sampling approach. The context similarity analysis may be performed without the sparse sensor signals. In accordance with an embodiment, the primary and Further electronic device software modifications may include changes to enable context logging with requested modality or a dedicated sensor signal, construction of sparse domain signals, and compression sensing methods. The software modifications may also include changes to enable attaching the contextual cues as metadata or payload overhead to the actual media stream or content file.

The comparison of content similarity by comparing compressed domain sparse contextual cues is implemented in a networked server using a software module that is able to receive contextual cues from commercial content providers and devices of individual users. The server provides a functionality to compare contextual cues and make a similarity analysis against existing content stored in a database. Alternatively, the networked server may conduct a similarity check of two or more content streams containing contextual cues.

The contextual information attached to the recorded content, as disclosed herein, can be utilized to identify and classify different content streams with their contextual watermarks. The correlation of different content streams based on the contextual watermarks enables various use cases.

In a first use case, the contextual cues may be applied to find content streams that were recorded at the same time, in the same location, or from the same source. The contextual watermarking identifies and links the content to other media steams.

In a second use case, the information about the origin of the content may be further applied for different service provisions. The user may for example inform the original content owner, artist, or event organizer about their interest on the topic by operating his device to transmit the contextual cues of the particular content. In this case the contextual cues may be understood as certificate of interest and active participation.

In a third use case, the original content owner detecting a similarity may provide additional information, membership offers, content recommendations, marketing information, or product offers for the active user.

In a fourth use case, the similarity detection based on contextual cues may also be applied for verifying the integrity of the recording. The user device may apply the information as a proof of content originality. The given cues identify that the content was recorded in known location at a certain time. The content may then be applied as additional stream to the existing database. The service provider may combine different steams and create multi-view presentations with "crowd sourced" material. For example, documentaries on various events can be enlarged with additional viewpoints.

In a fifth use case, two or more different content owners may compare their recordings and possibly exchange content that is recorded in the same context. The content match can be done by a dedicated content server. The service users may then compose new presentations with additional material from other users. Different content streams to be combined and edited may be synchronized with available contextual cues.

In a sixth use case, the content comparison is critical regarding the timing information. The secondary content comparison is successful only if both primary and secondary content cues are aligned correctly. Hence, any modifications of the primary or secondary content, such as cutting material away or adding something, can be detected immediately. The secondary content is location and time critical. The additional sensor information captures the unique knowledge about the recording environment and conditions. They cannot be replicated later.

In a seventh use case, content identification cues enable ranking of media content. In addition to knowledge and search criteria of content creator, performer and title, the captured media may be classified and ranked based on how many versions of the content are linked to it with contextual water marking.

In one embodiment, a contextually watermarked media is utilized to connect users to a restricted group. Presently, a consumer may be connected to a company by subscribing to a company's social media page. For example, "liking" a company on Facebook. A company is then able to distribute content to its subscriber list.

However, a company may offer restricted content to users associated with a restricted group. A consumer may gain access to the restricted group by presenting a contextually watermarked media to the company that satisfies the comparison. Presenting the contextually watermarked media may take many forms, to the user allowing the company access to a database of contextually watermarked media, uploading the contextually watermarked media, transmitting the metadata associated with the contextually watermarked media, and the like.

In another embodiment, a contextually watermarked media is utilized to provide connected information for publications. For example, a hotel resort may want to publish information on their web page about the present weather conditions, audio visual entertainment within the area, and activities the guests are experiencing, including the content created by individual guests with their mobile phones. The resort may capture a constant webcast with some contextual information such as air temperature. The guests on the other hand are taking pictures, videos and measuring the environment with all the available sensors of their mobile phones. The data streams from the mobile phones of individual users may be connected to the master content the resort is providing in the webcast. The guests are, for example, requested to share content in exchange for free Internet connectivity.

People surfing the web and checking the conditions in the resort are provided with a composition of the resort's master content and additional sensor information as well as pictures and video clips from the resort's guests.

In yet another embodiment, contextual watermarks are utilized to collect content and discover services. The contextual identification, with both primary and secondary sensory content, enables an efficient means to detect content that was captured in the same location in the same time window. The sensor modalities of the contextual data may not even be available in identical modalities. As seen in Table 1, above, the comparison can be done indirectly.

The content collection use case enables even an individual user to gather a set of content from the desired location and in desired time window. The user device sends a reference content in the service such as YouTube. The service checks the time window and the content. A search of a content database assists making the comparison. The service provides links to all the connected content found in the database. For example, a hotel resort may collect customer experiences related to a special occasion or event they had arranged.

In yet another embodiment, the contextual watermarking is utilized as a social media extension. In May 2015, Google Photos introduced a photo and video sharing service with social media background, allowing users to upload photos and videos to the service and access the content everywhere from every device. In that sense it is very prominent platform for new contextual tools.

When users share photos and videos publicly, the service may run through the contextual cues in the primary and secondary content and find connections. There would be completely new social media aspect when individual users, event organizers and record labels (or their content) were linked together based on the photos and videos stored in the service.

In yet another embodiment, the contextual watermarking is utilized to subscribe to a social media feed. Social media links people to each other and supports the sharing of content and information over the web. The next phase on giving support for something is simply to take a picture of it. An enhanced picture sharing service according to embodiments described herein will analyze the contextual cues and link the content to the original location or event. Thus, there is no need to search for the web page, QR code, or find the RFID tags. It is enough to just be there, take a picture and share the content.

In one embodiment, service providers link different contextually watermarked media. For example, a user could provide his own clips as answers to the professionally created content or link his content to other user's contribution. The contextual classification would verify the linking.

In one embodiment, content editing tools are able to retrieve other media streams that share a linked contextual watermark. The other media streams may be professionally made media content or be associated with other amateur users. In this process, the content editing tool requests related content from available databases. The content from the event organizer or other users are handled as a quasi clip-art database. The content editing software fetches a list of linked content with accurate timing information. The extra content is added to the composed presentation.

In one embodiment, record labels utilize contextual watermarking to promote artists to active fans. A networked music service could link original concert recordings with all media content, pictures, video clips of individual users have stored e.g. in a cloud service. Additional metadata as a secondary contextual information collected together with the primary content would make the connection.

Services and mobile applications such as Meerkat (meerkatapp.co) and Periscope.tv (www.periscope.tv) could benefit from techniques described herein for detecting unauthorized content.

Internet of Things (IoT) platform providers and telecom companies building services on top of IoT can benefit from techniques described herein for organizing the vast amount of data that their devices are supposed to collect. In case of different type of devices connected to each other require indirect comparison of different modalities.

In accordance with an embodiment, contextually watermarked media is identified. The identification of the contextual watermarking is based on both the primary and secondary content. When individual users are capturing the media with mobile phone, the secondary content may consist of several different sensor modalities. The mobile phone user may collect information about the prevailing radio conditions, available radio beacons, the user and user device motion with accelerometer sensor, orientation with compass or gyroscope sensors, temperature, and lighting conditions with visual proximity sensor. Altitude, as well as air pressure changes, can be detected with manometers.

The secondary content analysis can be completed even when the modality of the secondary sensors is different between two media streams. Additionally, some of the secondary data may be unique to an electronic device and not necessarily the event it is associated with, such as if a user rotates the electronic device affecting an accelerometer.

Common signals for both an organizer and a user device may include:
  Overall radio conditions (cellular, available wireless devices, WiFi, Bluetooth)
  Overall lighting conditions (pyrotechnics, lighting effects, flashlights, time of day, indoor or outdoor location, frequency band detection)

Figure 16:
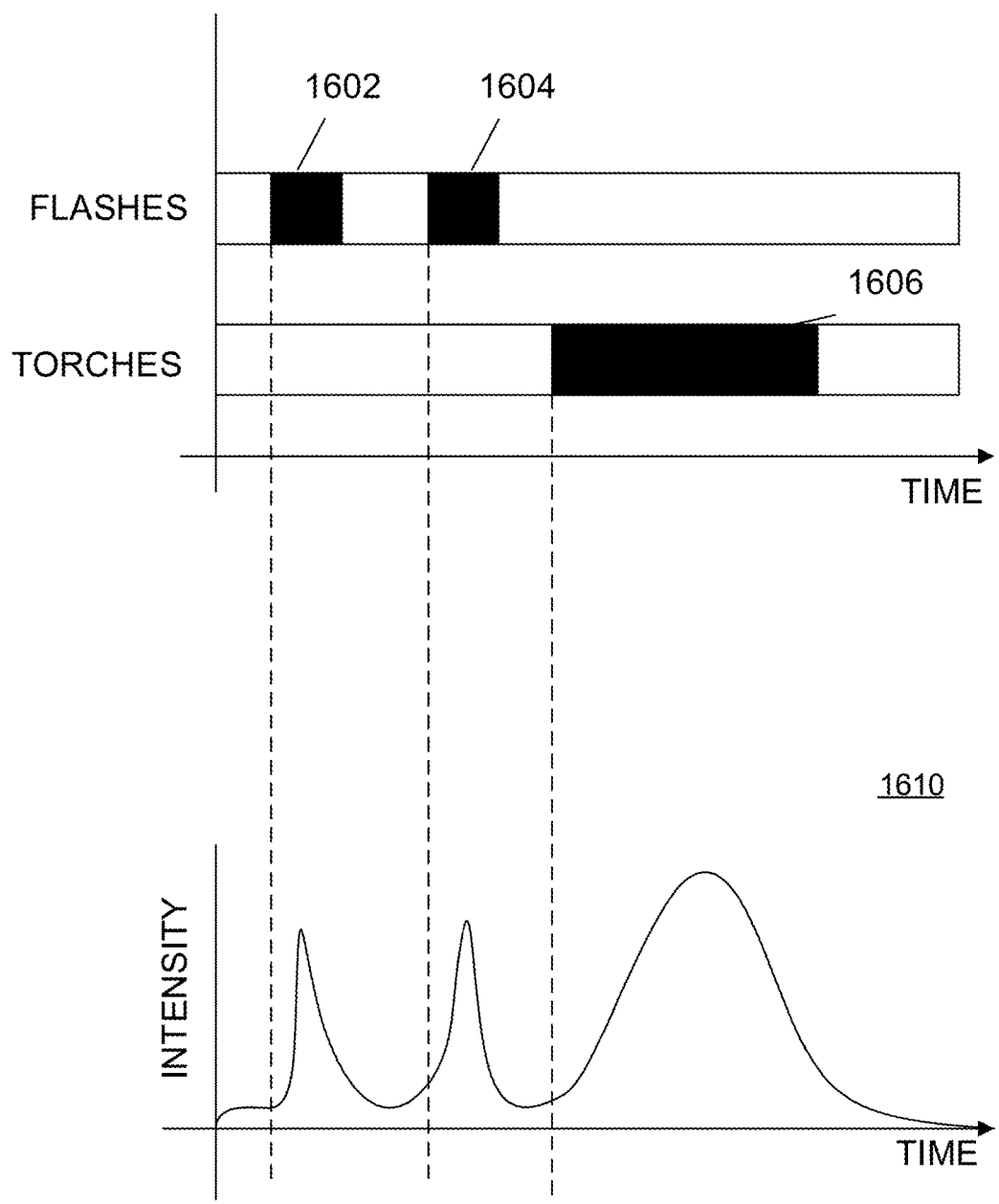
FIG. 16 depicts detection of a pyrotechnic show, in accordance with an embodiment.

FIG. 16 depicts detection of the pyrotechnic show, in accordance with an embodiment. In particular, FIG. 16 comprises a timing plan 1600 for pyrotechnics and light intensity sensor readings 1610. A pyrotechnic show may include a stage with emitted lights from various light fixtures or pyrotechnics. The lights may come from flash producing elements and a torch and be recorded by various recording devices. The timing plan for pyrotechnics comprises a time for flashes to emit light and a time for a torch to emit light. In the plan, the flashes exhibit two short flashes in quick succession (1602 and 1604) followed by the torch emitting light for an extended duration (1606). Additional contextual information, such as the frequencies associated with the emitted light may be included in the timing plan. Here, the ambient light sensor on an electronic device is utilized to detect the ambient light. It detects two quick spikes in light intensity followed by an extended period of light intensity. These readings may be associated with the light from the flashes and torch per the timing plan 1600. Any contextual cues associated with the lighting peaks can be used to correlate a media stream from the event with the event.

The ambient light sensor modality is convenient when comparing content from different users as the sensor is available in most smartphones. In addition, sensor readings contain clear transients especially when they are special visual effects.

Contextual information extracted can be encoded as a secondary content contextual cue. The secondary content contextual cues can even be applied to a photograph. The ambient light could be recorded continuously in a circular buffer whenever the camera application is active. The data is later stored as secondary data only if needed to associate with a media object.

In accordance with an embodiment, air pressure transients can be caused by audio events and ventilation. An event organizer may apply an audio stream to find some of the air pressure events. The analysis of air pressure events associated with sound is similar to the analysis of light intensity detection associated with a pyrotechnic display discussed above. A low pass filtered audio signal can be applied to search for low frequency events against which the air pressure sensor data is compared against an event organizers plan information.

An indirect contextual comparison may be performed when an event organizer does not have sensors available to detect secondary content directly. In this case, the event detected by the user device is determined from other sensors in the media stream. For example, a predetermined radio beacon signal is emitted by the event organizer or by a predetermined plan for changing the radio beacon signal. Alternatively, individual user motion may be dependent on overall audience movement. The user motion is captured via an accelerometer signal on an electronic device corresponding to average movement of the crowd visible in a video stream. One example is detecting a "Mexican Wave" type of movement in the crowd visually and via accelerometers in electronic devices.

Figure 17:
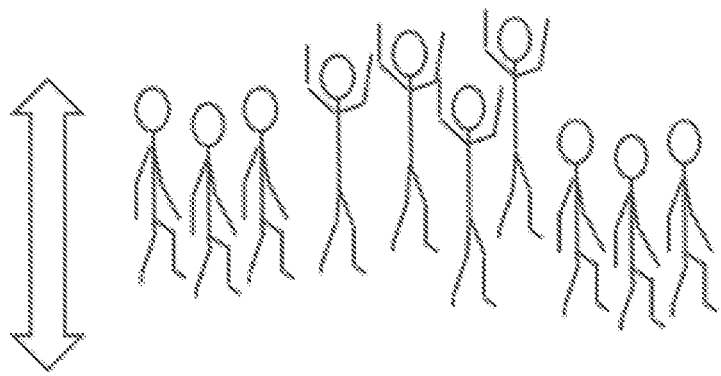
FIG. 17 depicts detection of a "Mexican Wave", in accordance with an embodiment.
Figure 17:
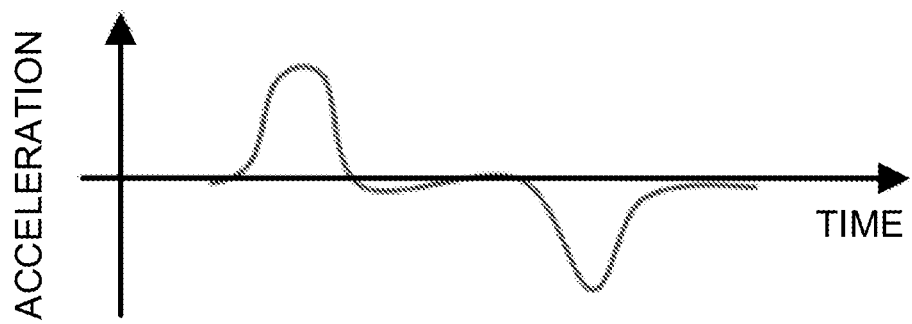

FIG. 17 depicts detection of a "Mexican Wave", in accordance with an embodiment. In particular, FIG. 17 depicts a video sequence detecting a "Mexican Wave" 1702 and an accelerometer sensor reading 1704 associated with an electronic device involved in a "Mexican Wave." The secondary cues associated with the detected visual motion and the accelerometer data can be utilized to generate a match of content based on the contextual cues.

The arrangement of the event in a building or a park can reveal information about the directions the users are pointing their devices to take pictures and capture videos. This information may exclude some streams in a similarity analysis. The indirect information from the reference content is the arrangement and the directions of the audience compared to the actual event. The data item utilized as event information for comparison could be a timestamp and a compass direction from the audience towards the event. The sensor signal from the user's content is a compass reading. The overall compass signal can be averaged and compared against other secondary content contextual cues.

FIGS. 18A and 18B depict indirect contextual cues associated with reverberation, in accordance with an embodiment. In particular, FIG. 18A depicts reverberation of sound in a room and FIG. 18B depicts reverberation of sound in an open space. The FIGS. 18A and 18B include a sound source 1802, a user device 1804 equipped with audio detection capabilities, and a measure of reverberation over time 1806. In accordance with an embodiment, an indirect contextual comparison of contextual cues is used to determine a contextual match. The indirect contextual comparison may be the reverberation displayed in FIGS. 18A and 18B.

As depicted in FIG. 18A, the sound from a sound source 1802A has multiple paths to the user device 1804A, thus, sound is detected over a longer period of time 1806A. As depicted in FIG. 18B, sound transmitted in open space from the sound source 1802B goes directly to the user device 1804B, and is thus detected over a shorter period of time 1806B as it is arriving only at one time. Various rooms and configurations may have various reverberation signatures. The reverberation signature may be utilized as a secondary contextual cue for comparison of media objects.

Figure 19:
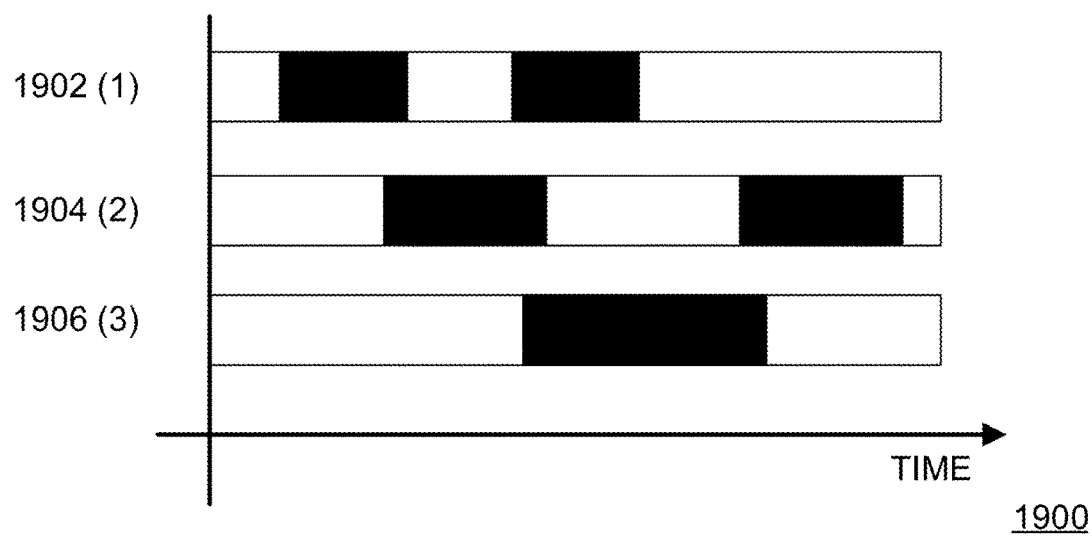
FIG. 19 depicts detection of multi-track audio content, in accordance with an embodiment.
Figure 19:
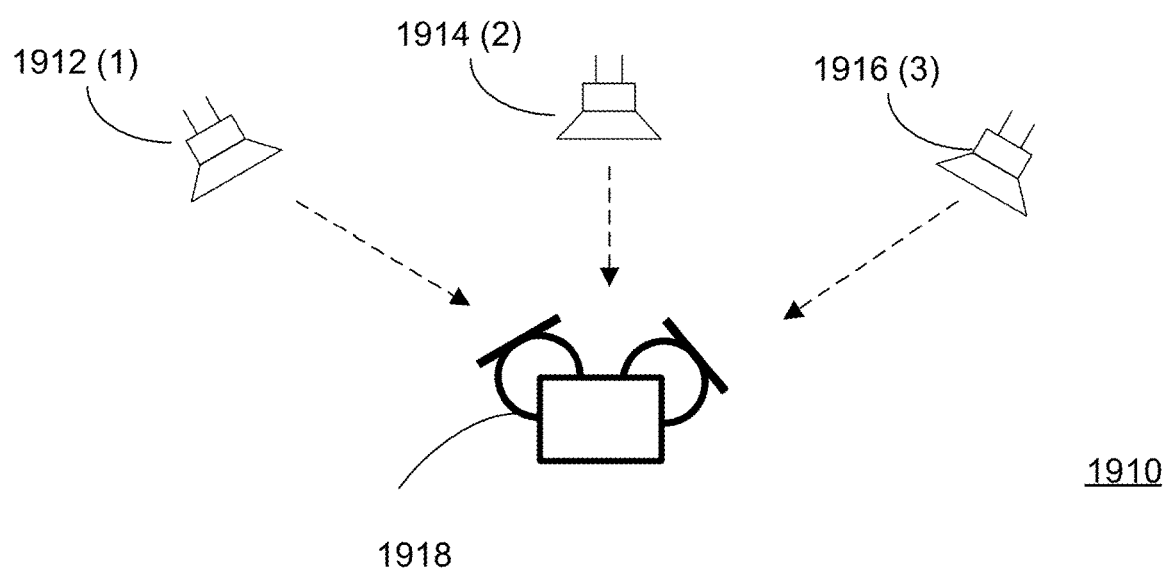
Figure 19:
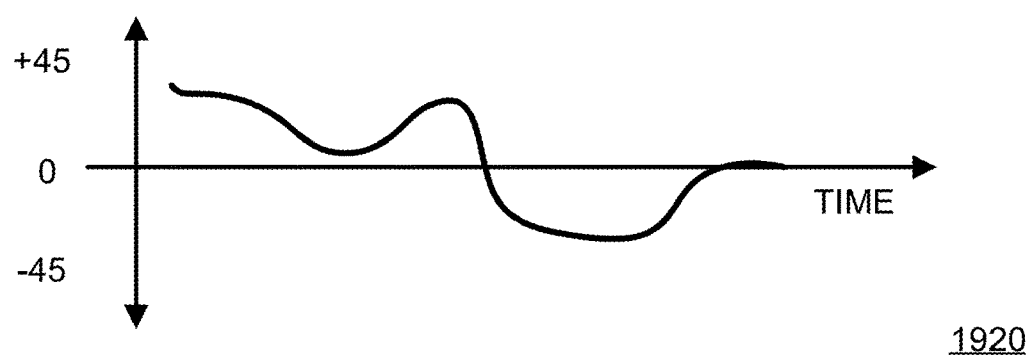

FIG. 19 depicts detection of multi-track audio content, in accordance with an embodiment. Directions, locations, and movement of audio sources in absolute and relative sense are unique for each event. The event organizer has knowledge about the location of loudspeakers and overall arrangement of the event. Determining the source locations from the user captured content reveals the similarity accurately. FIG. 19 presents an example of having a known audio content with known channel configuration. Dominant channels are determined at different times. When the loudspeaker positions are known, the changes in direction of dominant sources are unique for the configuration. When the use device is capturing the content, the unique audio direction of arrival can be analyzed. The achieved pattern can be applied as "indirect" contextual cue for classifying the similarity.

FIG. 19 includes a speaker transmission schedule 1900 that indicates when speaker 1 will transmit audio at 1902, when speaker 2 will transmit audio at 1904, and when speaker 6 will transmit at 1906. The transmissions occur during the black bars, and thus speakers 1 and 2 transmit twice, and speaker 3 transmits once, per the schedule in 1900. FIG. 19 further includes a speaker and user device physical layout 1910. The layout 1910 depicts the locations 1912, 1914, and 1916 of the speakers 1-3, respectively, speakers in relation to the position of the user device 1918. Speaker 1 is located in a direction of +45° in relation to the user device, Speaker 2 is located in a direction of 0° in relation to the user device, and Speaker 3 is located in a direction of −45° in relation to the user device. FIG. 19 further includes a determined direction of audio at 1920. Per the schedule 1900, when speaker 1 transmits first, the sound is initially detected near +45°, then when only speaker 2 is transmitting, the sound is detected closer to 0°. Similarly, when only speaker 3 is transmitting, the sound is detected closer to −45°.

Figure 20:
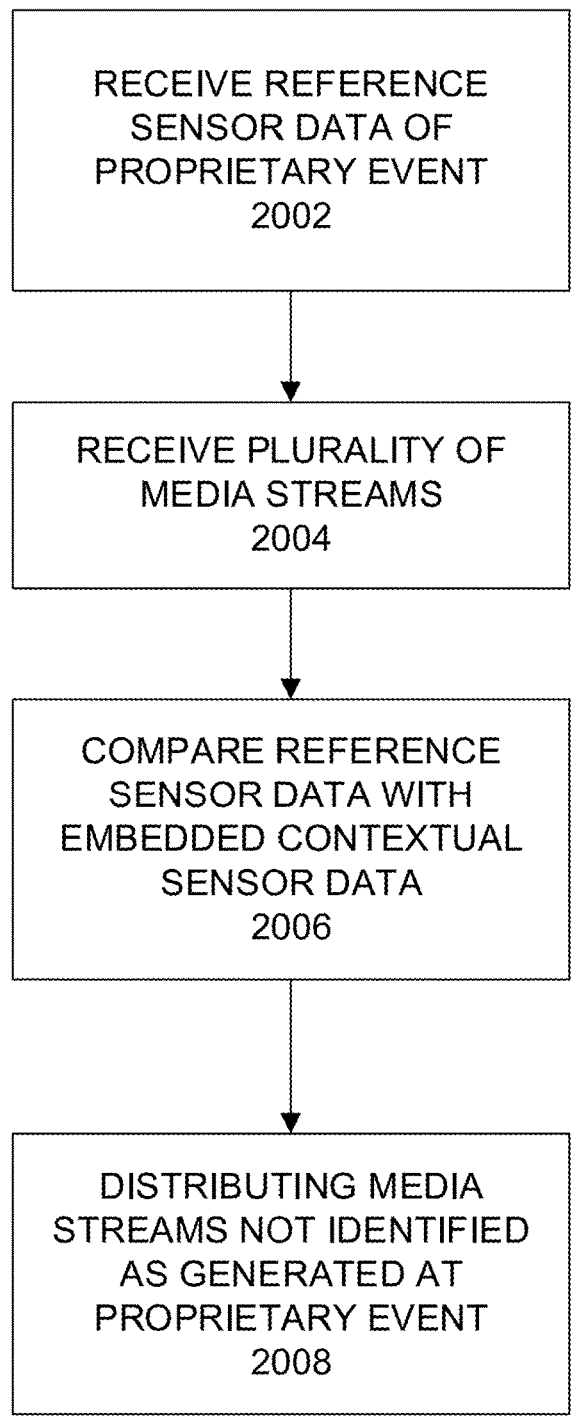
FIG. 20 depicts a method, in accordance with an embodiment.

FIG. 20 depicts an example method, in accordance with an embodiment. In particular, FIG. 20 depicts the method 2000 that includes receiving reference sensor data of a proprietary event at 2002, receiving a plurality of media streams at 2004, comparing the reference sensor data with contextual sensor data embedded in the media streams at 2006, and distributing media streams not identified as generated at the proprietary event at 2008.

At 2002, the reference sensor data characterizes a proprietary event, and may include at least one detected SSID, a time series of detected SSIDs, detected wireless radio signal strength levels, detected atmospheric pressure levels, or the like. At 2004, a plurality of media streams is received, each media stream including respective embedded contextual sensor data. The embedded contextual sensor data may include similar items as the reference sensor data, such as at least one detected SSID, a time series of detected SSIDs, detected wireless radio signal strength levels, detected atmospheric pressure levels, or the like. In some embodiments, the reference sensor data is collected at the proprietary event. In some embodiments, the reference sensor data is determined indirectly based on a pre-planned design. The pre-planned design may include a timing schedule of wireless radio transmissions at the proprietary event.

At 2006, the reference sensor data is compared with the contextual sensor data embedded in the media streams to identify streams generated at the proprietary event. The comparison may include determining a cross-correlation value between at least a portion of the embedded contextual sensor data and the reference sensor data. If the cross-correlation value exceeds a threshold, the stream is identified as being generated at the proprietary event. The comparison may further include determining relative time differences between transients in the media stream and determining relative time differences between transients in the reference data, and comparing the two relative time differences. Relative time differences may also be between transients in a media component of a media stream and transients in the contextual sensor data.

At 2008, media streams from the plurality of media streams are further distributed only if not identified as being generated at the proprietary event. The method may further include, in response to a determination that a first stream was generated at the proprietary event, sending a warning to a user of a device from which the first stream was received. In an embodiment, a user of a device from which the first stream was received may be blocked from accessing the media streaming service, receive a warning, and the like. In another embodiment, the media from the first stream is streamed to the owner of the proprietary event for human verification that the video stream is of the proprietary event, and in response to a positive human verification that the first media stream displays the proprietary event, the user of the first media stream receives a feedback message regarding the positive verification, a warning, or is blocked from using the media streaming service.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

I claim:

1. A multimedia distribution method comprising:
receiving reference sensor data characterizing an event;
receiving a plurality of media streams for potential distribution, each media stream including respective embedded contextual sensor data;
for each stream, comparing the reference sensor data with the respective embedded contextual sensor data to identify streams generated at the event; and
distributing only those media streams that are not identified as being generated at the event.

2. The method of claim 1, further comprising, in response to a determination that a first stream was generated at the event, sending a warning to a user from which the first stream was received.

3. The method of claim 1, wherein the comparing includes determining a cross-correlation value between at least a portion of the embedded contextual sensor data and the reference sensor data.

4. The method of claim 3, wherein a stream is identified as being generated at the event only if the cross-correlation value exceeds a threshold.

5. The method of any of claim 1, wherein the comparing further comprises:
determining a first time difference between transient sensor signals in the reference sensor data;
determining a second time difference between transient sensor signals in the embedded contextual sensor data; and
comparing the first and second time differences.

6. The method of any of claim 1, wherein the comparing further comprises:
determining a first relative time difference between i) an occurrence of a transient in a media stream in the plurality of media streams and ii) an occurrence of a transient in the respective embedded contextual sensor data;
determining a second relative time difference between i) an occurrence of a transient detected by a reference media detector and ii) an occurrence of a transient in the reference sensor data; and
comparing the first relative time difference to the second relative time difference.

7. The method of claim 1, wherein the embedded contextual sensor data and the reference sensor data each include at least one detected Service Set Identifier (SSID).

8. The method of claim 1, wherein the embedded contextual sensor data and the reference sensor data each include a time series of detected Service Set Identifiers (SSIDs).

9. The method of claim 1, wherein the embedded contextual sensor data and the reference sensor data each include detected wireless radio signal strength levels.

10. The method of claim 1, wherein the embedded contextual sensor data and the reference sensor data each comprise detected atmospheric pressure levels.

11. The method of claim 1, wherein the embedded contextual sensor data and the reference sensor data are compressed-domain data.

12. The method of claim 1, wherein the embedded contextual sensor data and the reference sensor data include time stamps of transient sensor signals and wherein the comparing includes comparing time stamps of the reference sensor data and of the embedded contextual sensor data.

13. The method of claim 1, wherein the reference sensor data is collected at the event.

14. The method of claim 1, wherein the reference sensor data is determined indirectly based on a pre-planned design.

15. The method of claim 14, wherein the pre-planned design comprises a timing schedule of wireless radio transmissions at the event.

16. A system comprising:
a processor; and
a non-transitory computer-readable medium containing instructions executable by the processor to cause the system to:
receive reference sensor data characterizing an event;
receive a plurality of media streams for potential distribution, each media stream including respective embedded contextual sensor data;
for each stream, compare the reference sensor data with the respective embedded contextual sensor data to identify streams generated at the event; and
distribute only those media streams that are not identified as being generated at the event.

* * * * *